US012109174B2

(12) United States Patent
Samandari

(10) Patent No.: US 12,109,174 B2
(45) Date of Patent: Oct. 8, 2024

(54) ORTHOTROPIC AND ORTHODONTIC ORAL DEVICE AND METHOD

(71) Applicant: Keystone Orthotropics LLC, Phoenix, AZ (US)

(72) Inventor: Nafys Samandari, Scottsdale, AZ (US)

(73) Assignee: Keystone Orthotropics LLC, Phoenix, AZ (US)

( * ) Notice: Subject to any disclaimer, the term of this patent is extended or adjusted under 35 U.S.C. 154(b) by 808 days.

(21) Appl. No.: 17/138,831

(22) Filed: Dec. 30, 2020

(65) Prior Publication Data

US 2021/0121371 A1 Apr. 29, 2021

Related U.S. Application Data

(63) Continuation-in-part of application No. PCT/US2020/027279, filed on Apr. 8, 2020, and a continuation-in-part of application No. 16/711,128, filed on Dec. 11, 2019, now abandoned, and a continuation-in-part of application No. 16/383,223, filed on Apr. 12, 2019, now Pat. No. 10,555,876.

(51) Int. Cl.
*A61J 17/00* (2006.01)

(52) U.S. Cl.
CPC ........... *A61J 17/107* (2020.05); *A61J 17/001* (2015.05)

(58) Field of Classification Search
CPC .......... A61J 17/00; A61J 17/001; A61J 17/02; A61J 17/105; A61J 17/107; A46B 2200/1066; A46B 15/0055; A46B 9/005; A46B 9/026; A46B 9/02; A46B 9/028; A61H 13/00
See application file for complete search history.

(56) References Cited

U.S. PATENT DOCUMENTS

| | | | |
|---|---|---|---|
| 2,520,773 | A | 8/1950 | Muller |
| 2,588,069 | A | 3/1952 | Allen |
| 2,876,773 | A | 3/1959 | Witz |
| 3,113,569 | A | 12/1963 | Barr |
| 3,130,725 | A | 4/1964 | Griesinger |
| 3,610,248 | A | 10/1971 | Davidson |

(Continued)

FOREIGN PATENT DOCUMENTS

| | | |
|---|---|---|
| DE | 102004031106 | 1/2006 |
| GB | 2480453 | 11/2011 |

(Continued)

*Primary Examiner* — Dianne Dornbusch

(74) *Attorney, Agent, or Firm* — Knobbe, Martens, Olson & Bear, LLP

(57) ABSTRACT

A hygienic oral pacification device includes a fluid-filled bladder. The bladder includes a nipple and alveolar ridge-mating flanges. The bladder is dynamically shaped and allows for pressures provided by the suckling child to re-shaping the bladder and flanges. A bite-block extends into the bladder to maintain a fluid path from nipple to flanges. As the child completes the suckling cycle, the bladder nipple is depressed and fluid is forced in the engorging flanges. The flanges thus cover the alveolar ridges and fill the vestibules. Hard pads set along a superior surface of the nipple are compressed against the maxilla palate and provide lateral force to encourage expansion of the palate. The nipple may be bifurcated into left and right opposing lobes which can split laterally to enhance lateral force on maxilla.

22 Claims, 30 Drawing Sheets

(56) References Cited

U.S. PATENT DOCUMENTS

| | | | |
|---|---|---|---|
| 3,924,621 | A | 12/1975 | Cassimally |
| 4,115,893 | A | 9/1978 | Nakata et al. |
| 4,505,398 | A | 3/1985 | Kesselring |
| 5,133,740 | A | 7/1992 | Kussick |
| 5,190,174 | A | 3/1993 | Klag |
| 5,342,398 | A | 8/1994 | Sun |
| 5,474,028 | A | 12/1995 | Larson |
| 5,553,726 | A | 9/1996 | Park |
| 5,711,759 | A | 1/1998 | Smith et al. |
| 5,922,010 | A | 7/1999 | Alanen et al. |
| 6,241,110 | B1 | 6/2001 | Hakim |
| 6,602,013 | B2 | 8/2003 | Clark |
| 6,769,828 | B2 | 8/2004 | Clark |
| 7,144,416 | B2 | 12/2006 | Struckmeier et al. |
| 8,211,144 | B2 | 7/2012 | Rohrig |
| 10,555,876 | B1 | 2/2020 | Samandari |
| 2001/0029324 | A1 | 10/2001 | Walker et al. |
| 2002/0063103 | A1 | 5/2002 | Kiernan |
| 2003/0034031 | A1 | 2/2003 | Lev |
| 2003/0163162 | A1 | 8/2003 | Uehara et al. |
| 2004/0220618 | A1 | 11/2004 | Rohrig |
| 2007/0131637 | A1 | 6/2007 | Tamura |
| 2007/0208380 | A1 | 9/2007 | Ebner |
| 2007/0221604 | A1 | 9/2007 | Hakim |
| 2007/0238063 | A1* | 10/2007 | Tesini .................. A61J 17/107 433/7 |
| 2007/0272645 | A1 | 11/2007 | Ito |
| 2008/0033489 | A1 | 2/2008 | Tesini et al. |
| 2008/0210655 | A1 | 9/2008 | Rees et al. |
| 2009/0139950 | A1 | 6/2009 | Greter et al. |
| 2009/0248074 | A1 | 10/2009 | Kliegman et al. |
| 2010/0140204 | A1 | 6/2010 | Vischer |
| 2011/0046671 | A1 | 2/2011 | Okoturo |
| 2011/0100944 | A1 | 5/2011 | Van Der Kooi et al. |
| 2011/0184460 | A1 | 7/2011 | Hakim |
| 2012/0053632 | A1 | 3/2012 | Tirosh |
| 2012/0078143 | A1 | 3/2012 | Hernandez et al. |
| 2013/0263864 | A1 | 10/2013 | von Treuenfels |
| 2013/0304121 | A1 | 11/2013 | Hakim |
| 2014/0046370 | A1 | 2/2014 | Fave-Lesage |
| 2015/0142054 | A1 | 5/2015 | Itzek |
| 2015/0164749 | A1 | 6/2015 | Lacroix |
| 2016/0081884 | A1 | 3/2016 | Palmer |
| 2017/0000694 | A1 | 1/2017 | Lee |
| 2017/0151131 | A1 | 6/2017 | Bawa |
| 2018/0311112 | A1 | 11/2018 | Moor |

FOREIGN PATENT DOCUMENTS

| | | |
|---|---|---|
| JP | H0956787 | 3/1997 |
| KR | 20140141944 | 12/2014 |
| WO | WO2011092706 A1 | 8/2011 |

* cited by examiner

A-A

ORTHOTROPIC AND ORTHODONTIC ORAL DEVICE AND METHOD

CLAIMS OF PRIORITY

The present application includes subject matter disclosed in and claims priority to U.S. patent application Ser. No. 16/711,128, filed Dec. 11, 2019, entitled "Hygienic and Orthotropic Oral Devices"; and application Ser. No. 16/383,223, filed Apr. 12, 2019, entitled "Pacifier with Cleaning Brush" (now U.S. Pat. No. 10,555,876); and provisional patent application entitled "Improved Pacifier and Nipple" filed Jul. 11, 2019 and assigned Ser. No. 62/872,900; and also PCT application Serial No. PCT/US20/27279, filed Apr. 8, 2020, incorporated herein by reference, which describe inventions made by the present inventor.

BACKGROUND OF THE INVENTION

1. Field of the Invention

The present invention relates to the general art of oral care. The present invention more particularly relates to a pediatric dental oral hygiene and orthotropic development devices and uses thereof.

2. Description of Related Prior Art

Improvements to the BINKI BRUSH, or pacifier with cleaning brush, may be used on pacifiers, bottle nipples, or other devices intended for use in a mouth. Children from the age of zero to two years commonly use oral apparati, such as pacifiers, bottle nipples, teethers, etc. for numerous purposes. As may be understood from the name "pacifier", the tool may be used to calm or soothe a child. Additionally, the tool may be used to exercise a child's tongue and cheek muscles, promote development of the maxilla, and otherwise serve to clean interior surfaces of the oral cavity via friction provided by the pacifier exterior surface(s). While newborns am often born without any erupted teeth, up to 15% of newborns in the United States have one or more teeth present. The "baby" tooth or teeth may be compromised due to decay caused by bacterial metabolic byproducts such as acids produced from substances in the oral cavity such as sugars present in milk, formula, or otherwise the tooth/teeth may be susceptible to damage from bacterial and fungal biofilms that may develop on the oral surfaces. It is therefore advantageous to include an oral apparatus that acts to clean, or otherwise brush, the upper and lower gingival ridges and/or erupted teeth. In addition, it has been shown that in the year 2014, approximately 40% of children under the age of 5 have some evidence of caries, often referred to as baby bottle caries.

Most oral apparati, such as pacifiers, binkies, soothies, etc., are often symmetrical. Oftentimes, a binky, or surrogate nipple, may be uniformly isometric, such as including a cylindrical nub with hemispherical cap (imitating a mother's biological nipple). Advanced oral devices may be transversely symmetrical, left to right, however, may include longitudinal shape changes such as alternating superior and inferior sides to better mimic the shape and location of the tongue, and the slight overbite of a baby, newborn, infant, or toddler. The promotion of an ideal orthotropic development of the maxillary and mandibular arches leads to the better development of the airway spaces, and this contributes to the prevention of multiple chronic maladies. As known in the field of orthotropics, deficiencies in airway spaces exacerbate these chronic conditions.

Prior attempts have been made to provide oral devices that achieve the dual purpose of pacification and oral hygiene, however, they suffer the drawbacks of improperly accounting for the changing shape of the mouth during the suckling exercise. Further, limited inventions have been directed to orthotropics and improvement of the development of the upper palate and/or mandible in the developing mouth. Nine out of ten children in the developed world may suffer some level of obstructive sleep apnea (OSA), including symptoms from sleep disorders, to breathing issues, to growth retardation.

It is therefore a primary object of the present invention to provide an oral device that provides for friction activated cleansing and/or stimulation of interior oral surfaces.

It is another object of the present invention to provide a pacifier to mate with at least one of the superior or inferior ridges (gingival and/or tooth).

It is yet another object of the present invention to foster proper development of the orthognathic relationship of the upper and lower jaw bones.

It is as yet a further object of the present invention to foster proper development of the upper palate and related bone structures.

It is a further object of the present invention to provide an easy to use oral device useful for babies and/or small children.

These and other objects of the present invention will become apparent to those skilled in the art as the description thereof proceeds.

SUMMARY OF THE INVENTION

The present invention is also directed to an oral device adapted to be partially inserted into the oral cavity. The present invention may take the form of a pacifier, bottle nipple, or otherwise. As a pacifier, the shield set on the outer surface of the lips, and the nipple, with flanges/wings emplaced within. When functioning as a bottle feed nipple, as single molded piece is preferred to fit over an open end of a bottle.

In the previous version, the upper portion of the intra oral device includes a preferably solid and/or flexible padding with one or more materials. Harder or thicker, those of a higher durometer, portions of the dome (or pads) will be separable, or at least change their relative orientation, as the central material stretches. A central bite block, as well as shield and/or cap may be made of one or more stiffer material(s). As the sucking motion is conducted, a tongue pressure pushes up on the bottom of the nipple (preferably at the tongue guide depression) and causes lateral stretching of the device. As the device is stretched, the harder/thicker portions at the top side resist stretching and are thus thrust against the upper palate and cause a slight upward and laterally outward force. The lower portion includes a tongue depression to better ensure proper alignment of device with the center of mouth and tongue. The outer surface of the device may include bristles, or a spiral shape for cleaning purposes, often as rubbed against surfaces of the mouth.

A nipple version of the present invention may include various undulations, and/or ribs, to cause proper turbulence of flowing fluids, to provide stimulation/cleaning to the oral surfaces, and to prevent vacuum seals on the mouth surfaces, and avoid hematomas. The angle of the pronation of the teeth and/or alveolar ridges is prevented from exceeding certain thresholds, e.g. 20° pronation that can cause adverse deformation of the malleable (growing) jaws. Further, the superior and inferior edges of the device, preferably at the collar, are offset with the superior set slightly (e.g. 1-3 mm) forward relative the inferior collar to promote proper orthotropic alignment of the maxilla and mandible relative the skull.

The present invention is directed to an oral pacification device adapted to be partially inserted into the oral cavity, with the shield set on the outer surface of the lips, and the nipple, with flanges/wings emplaced within. There are two components to the device—an extra-oral base piece and an intra-oral nipple. The intra-oral part includes a bladder formed within an exterior shell. The bladder includes an interior that is a fluid-filled chamber. The bladder forms the nipple that extends posteriorly with flanges/wings set on the bladder outer surface at the anterior end. It is contemplated that the flanges be set against the anterior surfaces of the alveolar ridge(s) and wings set posterior the ridges. The chamber has a passage opening from the nipple bulb and into the flanges/wings. Preferably the bladder is a single fluid filled chamber, but it may be sectioned. The shell of the bladder includes an outer surface that has surface features, such as a texture, fingers, bristles, etc. The textured surface may be set in direct contact with the ridges (either bare gums (edentulous), or with erupted teeth). In alternative embodiments, the textured surface may also extend along the inferior surface of the nipple and bulb to provide for cleaning of the top of the tongue, and along superior surface to clean the roof of the mouth/hard palate.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

With use of embodiments of the present invention, one may provide hygienic and/or orthotropic support to newborns, infants, children, adolescents (or even adults). The present invention maybe used to prevent adverse deformation of the tissues and bones associated with the mouth. When used in newborns and infants, the application of orthotropic devices can guide the eruption of teeth and position and orient the bones in an ideal position. Further, via application of rhythmic vibrational signaling, stem cells can be activated, and causing phenotype improvements via epigenetic expression guided via external stimulation of the genotype. Rhythmic vibrational signaling can increase or induce stem cell development in the area of the signal.

Proper orthotropic development may also have multiple other pathways for providing a healthier human, both aesthetically and for health factors. Obstructive sleep apnea affects millions of people of all ages. In children symptoms can range from bed wetting, choking, drooling, coughing, night sweats, behavioral problem, learning disabilities, sluggishness, snoring, teeth grinding, restlessness, attention deficit hyperactivity disorder (ADD or ADHD).

By forming an orthotropically aligned mouth (maxilla and mandible), a root cause of obstructive sleep apnea (OSA) can be minimized, controlled, or even eliminated. With the present invention and embodiments thereof, we may control or prevent these chronic and debilitating diseases.

Figure 13:
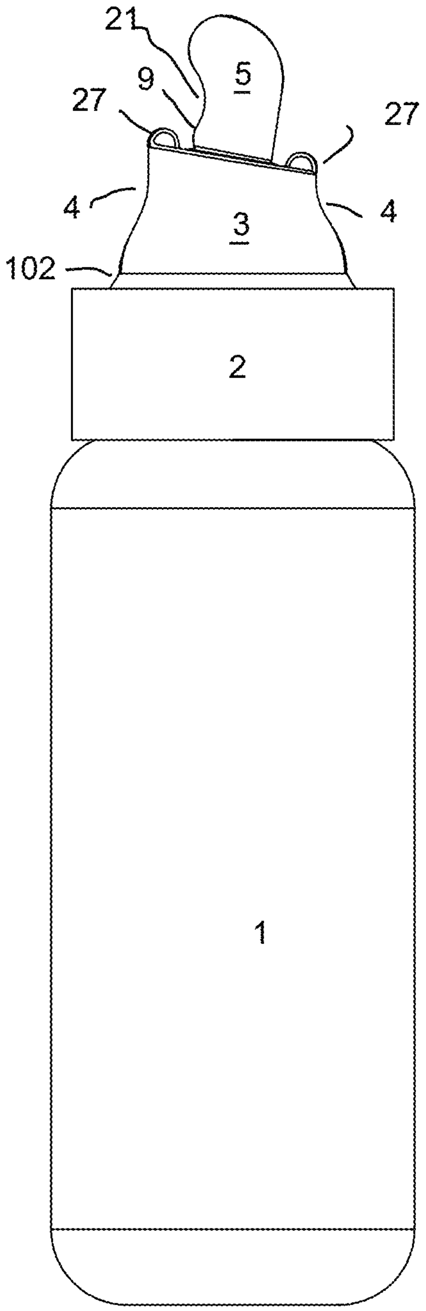
FIG. 13 illustrates a side view of a bottle embodiment of the present invention.
Figure 14:
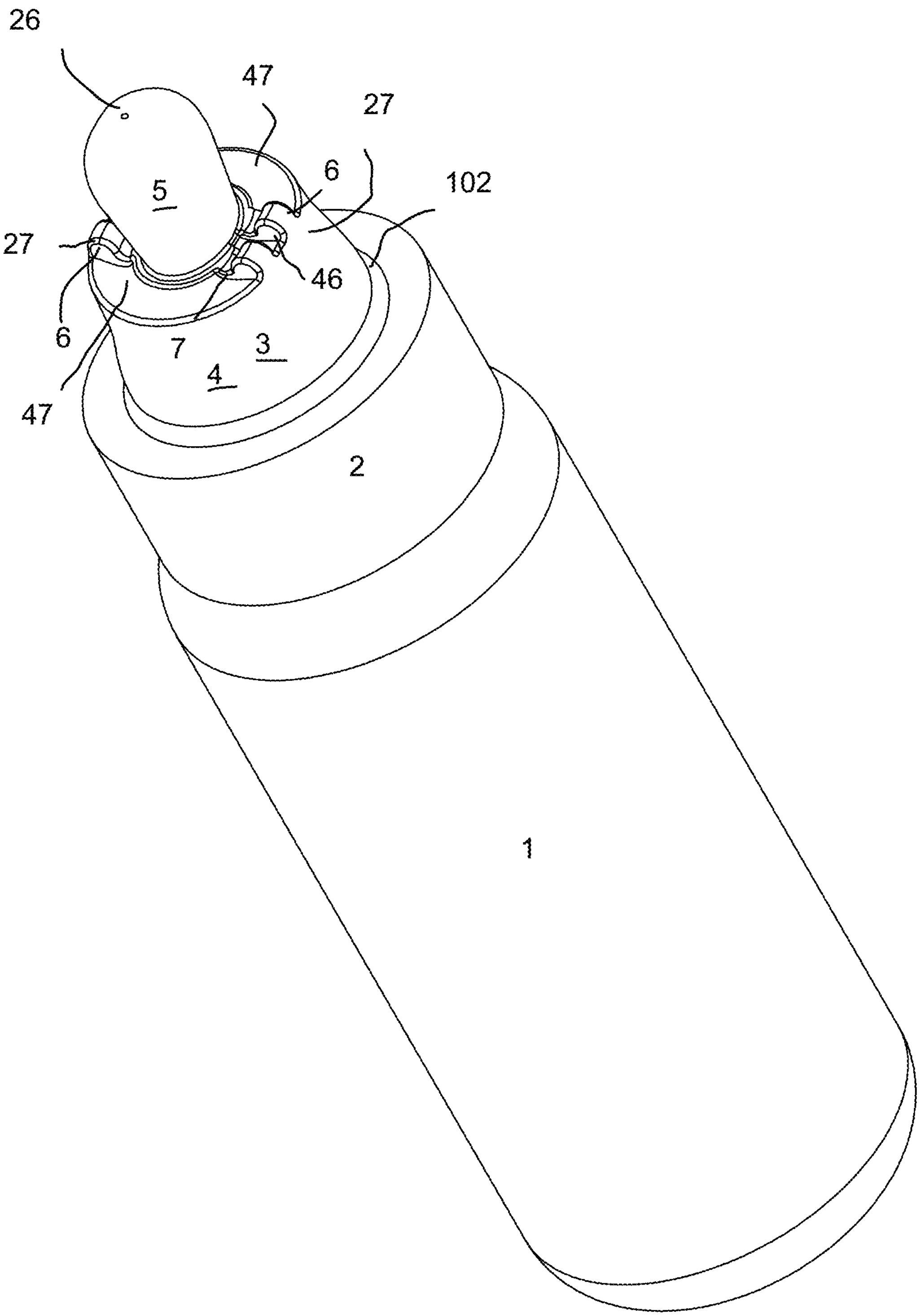
FIG. 14 illustrates a perspective view of a bottle embodiment of the present invention.
Figure 15:
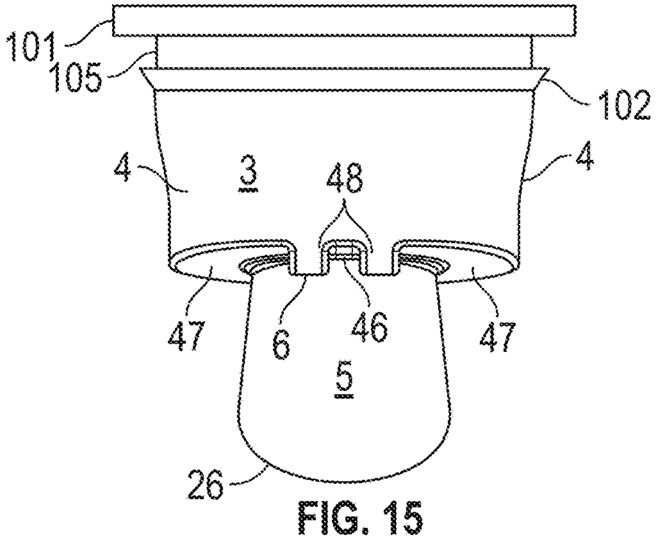
FIG. 15 illustrates a top view of a mouth portion of a bottle embodiment of the present invention.
Figure 16:
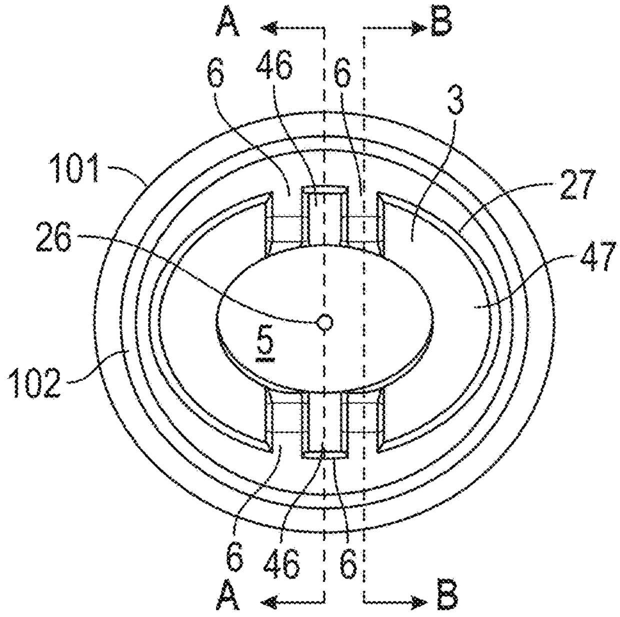
FIG. 16 illustrates a frontal view of a mouth portion of a bottle embodiment of the present invention.
Figure 17:
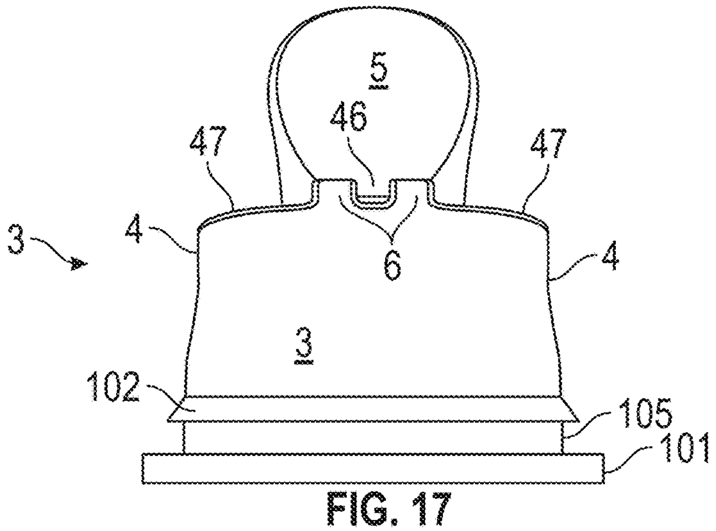
FIG. 17 illustrates a bottom view of a mouth portion of a bottle embodiment of the present invention.
Figure 18:
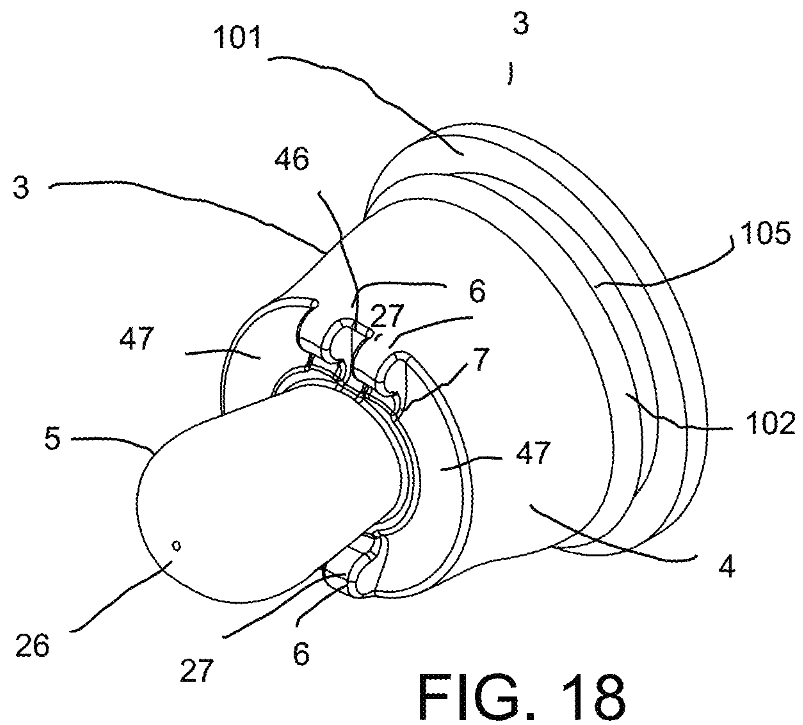
FIG. 18 illustrates a perspective view of a mouth portion of a bottle embodiment of the present invention.
Figure 19:
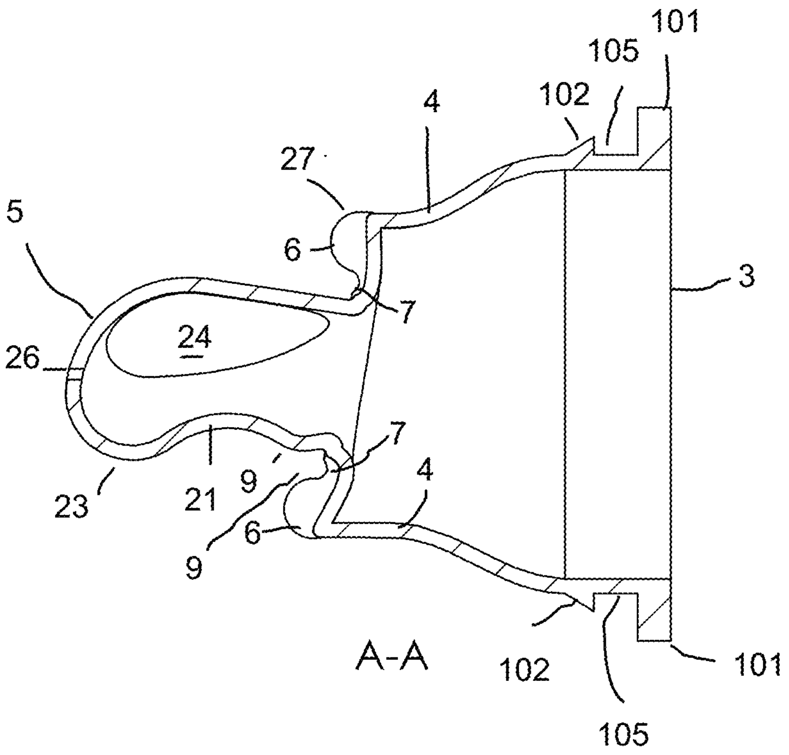
FIG. 19 illustrates a side cross-section view along lines A-A of FIG. 16.
Figure 20:
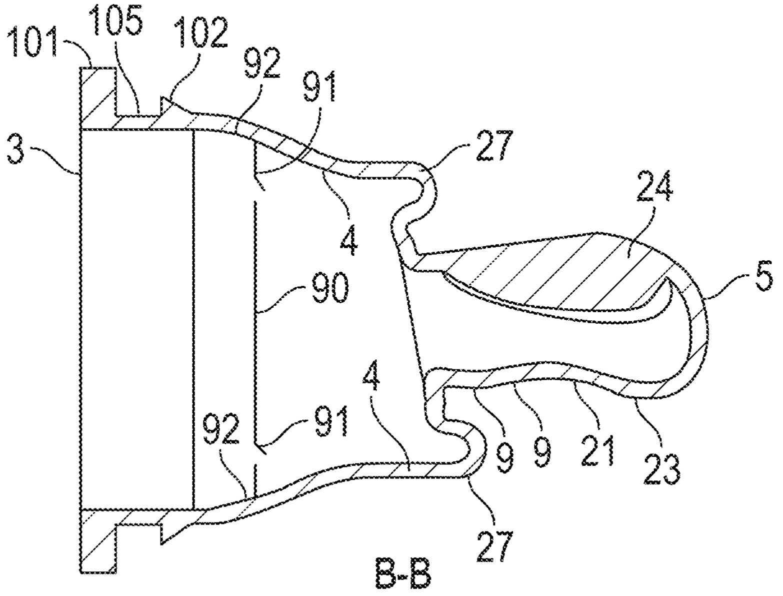
FIG. 20 illustrates a side cross-section view along lines 1-B of FIG. 16.

As can be seen in FIGS. 13-15, bottle 1 may be equipped with cap 2. Bottle 1 is shown with cap 2. Mouth portion 3 is set thereon, and includes skirt 27 and nipple 5. Cap 2 may be threadedly engaged to screw onto bottle 1. Mouth portion 3, fits onto cap 2, preferably via a channel lip fastening connection. It is preferable that cap may be removed from bottle via unscrewing, and nipple may be removed from cap, to facilitate cleaning of the bottle and components. Cap is preferably made of a hard plastic, while nipple is preferably made of a softer plastic, silicon, silicone, or other known material for nipples, bottles, and pacifiers. Nipple 5 may include air vent 29, preferably set outside area of lips when in use.

Figure 1:
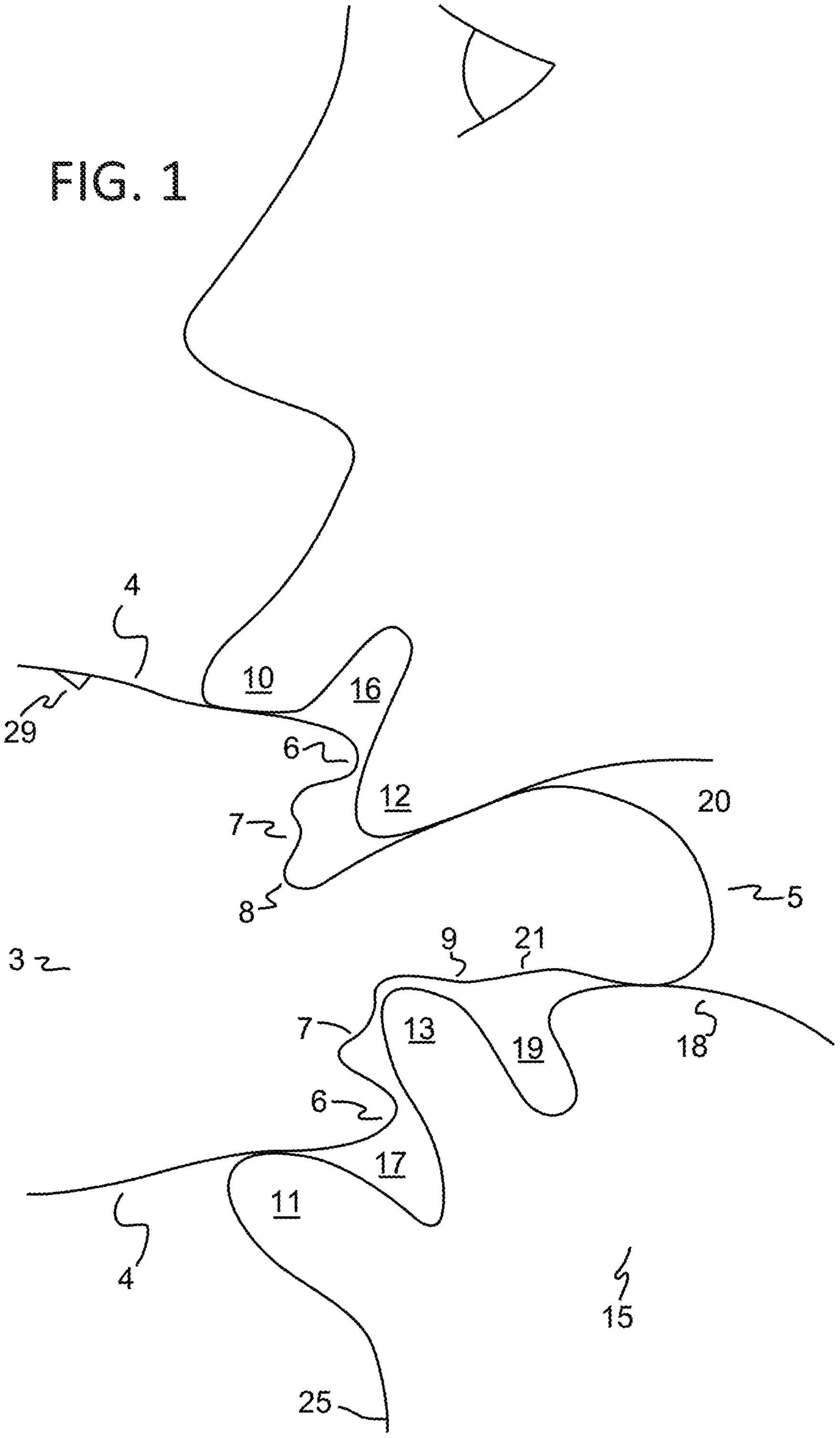
FIG. 1 illustrates a side cross-sectional view of a bottle embodiment in passive state as applied into a human mouth.
Figure 2:
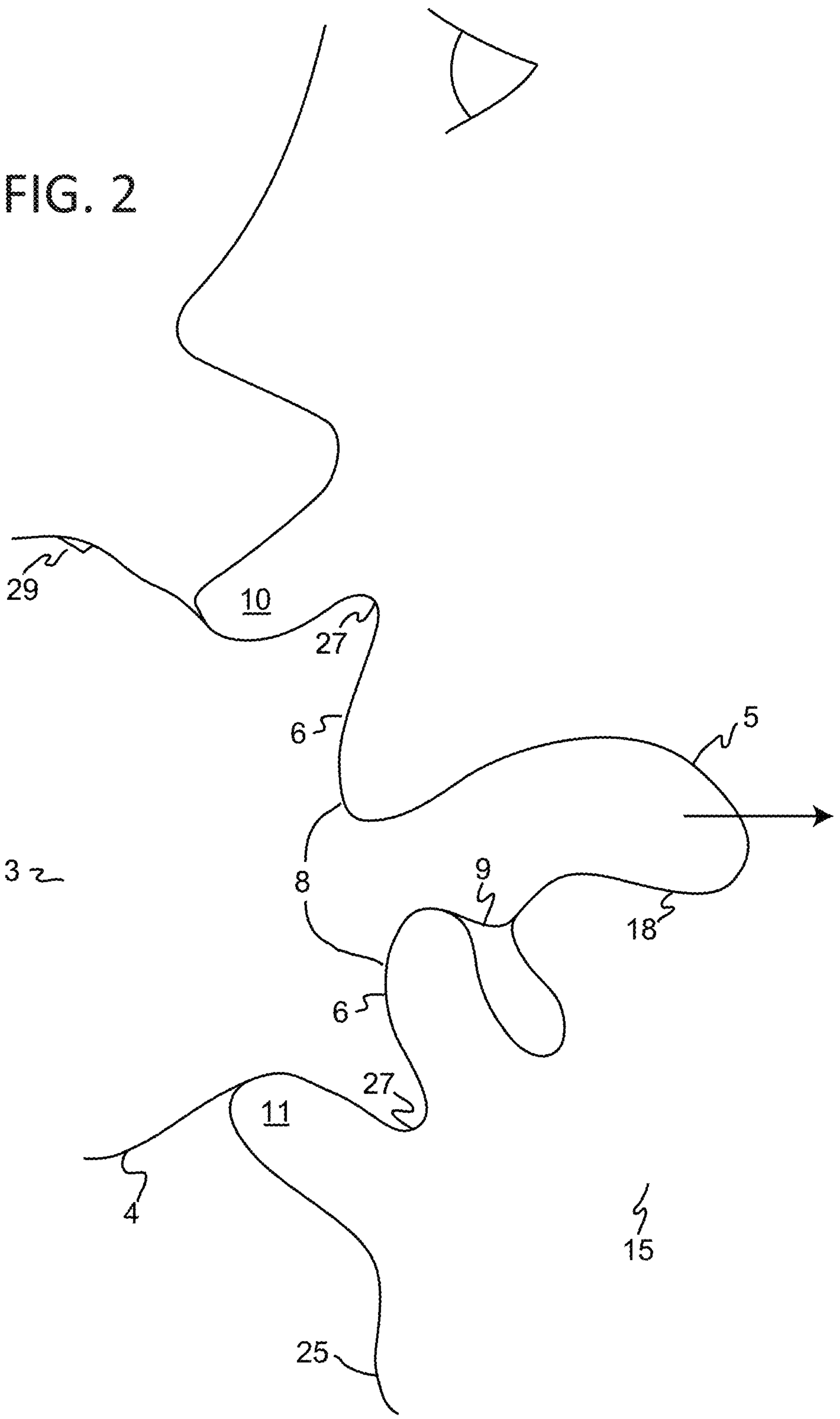
FIG. 2 illustrates a side cross-sectional view of a bottle embodiment in a compressed state as applied into a human mouth.

With reference to bottle mouth portion 3 in use with a human mouth, FIGS. 1-2 demonstrate two states of action. FIG. 1 demonstrate the mouth portion 3, including skirt 27 and nipple 5 applied to a human mouth prior to application of compressive forces. This is termed the passive state, as with equilibrium forces within and outside the mouth portion, the structure, shape, and orientation remain in passive form. Upper lip 10 and lower lip 11 of the user may fit onto neck 4 as a lip hold along mouth portion of nipple. Major undulations 6 may be provided opposite bottle along neck 4. Major undulations, including both superior major undulation and inferior major undulation 6A and 6B, are preferably set to fit into the maxillary buccal vestibule 16 and mandibular buccal vestibule 17, respectively. Minor undulations 7, fit along/between major undulations (as shown) and join with the main nipple 5 at collar 8. Together, the major and minor undulations form ribs.

When sucking, ribs encourage turbulence of fluid flowing within mouth part, and further prevent vacuum seal against oral surfaces. Ribs further allow expansion of the flanges (undulations) into the collar to fill in portions of the vestibules. Ribs, allow for mechanical cleaning of gums. Micro movements of the ribs may cause a rhythmic vibration, and vibrational signaling, on the oral surfaces to stimulate vascular development, tooth growth, and stem cell growth in the bony membrane and bone development/production. Ribs may form a skirt 27, while major undulations help define a skirt edge 47, that provides for a bumper to prevent excess pronation of the alveolar ridges to go beyond twenty-degrees from vertical axis 30 (or seventy degrees from horizontal plane 50). Vertical axis 30 and horizontal plane 50 meet at vertex 85, while skirt 27 is intended to roughly rotate along vertex from a more acute angle, as shown below in FIG. 28A, to the wider acute angle, as shown below in FIG. 28B, when exposed to compressive forces to achieve the compressed state (discussed below with reference to FIG. 2). Mandible 15 may be enclosed around nipple for use of bottle. User chin 25 is shown. Nipple 5 may include milk pore 26 at the proximal end of nipple. Milk pore can be one or more apertures in the nipple, dependent on the needed flow rate for feeding in relation to the age/size of infant/user.

Figure 3:
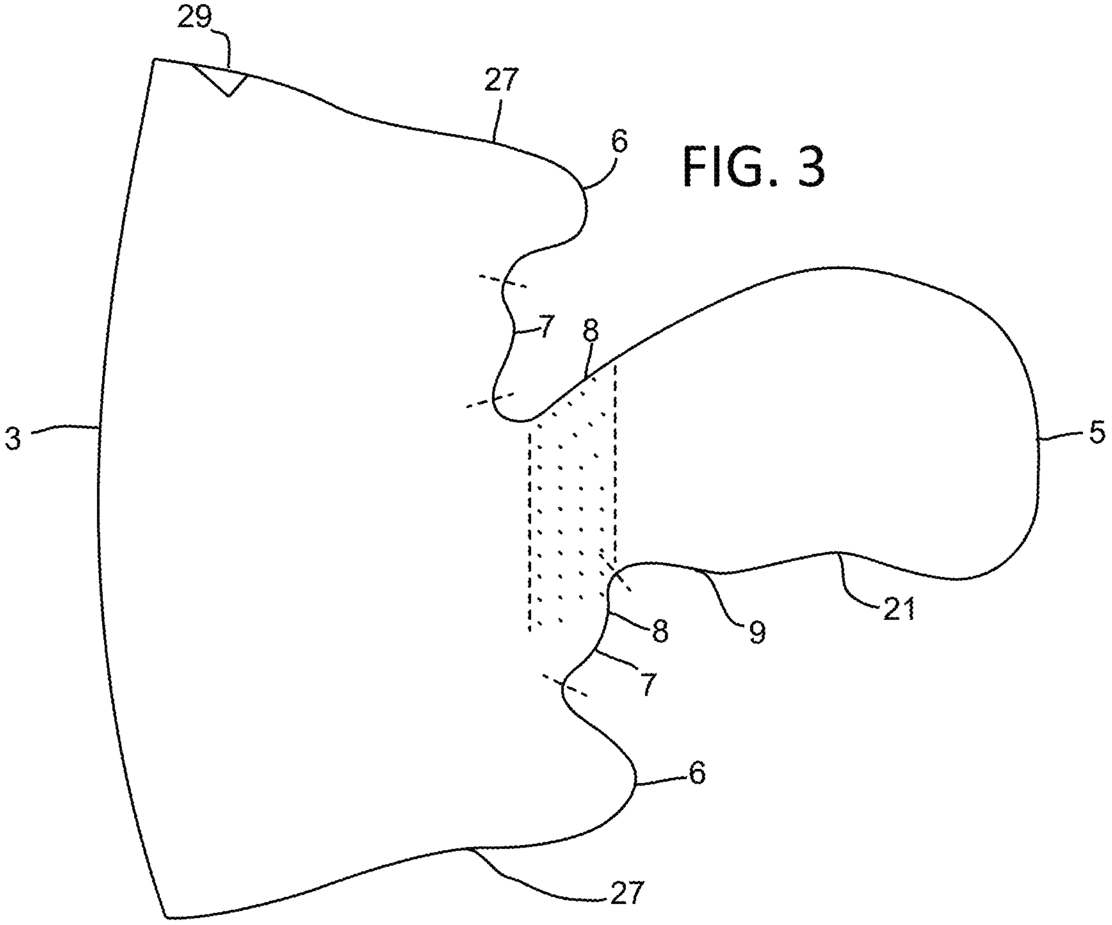
FIG. 3 illustrates a side cross-sectional view of the mouth portion in passive state of a bottle embodiment of the present invention.

As understood in reference to earlier FIGS. 1-3, between undulations and nipple, a collar 8 is formed. Collar 8 provides placement for maxillary alveolar ridge and mandibular alveolar ridge, respectively. Maxillary alveolar ridge 12 fits onto superior nipple collar, while mandibular alveolar ridge 13 fits into inferior nipple collar. An inferior lingual ridge 9 may be set as between the undulations and a depressed tongue guide 21. Tongue guide 21 provides for a depression to locate tongue 18. Tongue guide also causes tongue to provide upward force against maxilla, and otherwise exercise and develop habits to strengthen and encourage proper tongue placement when not feeding/using device, and trains the tongue positioning from an early age. Nipple 5 fits into vault 20 of user's mouth.

As seen in FIG. 2, the sucking action caused deformation of mouth portion 80 into a compressed state. Force vectors are shown via arrows. Lips 10 and 11 press, or otherwise provide push vector compressive forces against superior and inferior neck 4, respectively (neck 4 providing a lip hold). Upper and lower skirt, 77 and 87, expand, rotate, and move to fill maxillary and mandibular buccal vestibules, 16 and 17. Maxillary alveolar ridge 12 and mandibular alveolar ridge 13 engage collar 8 to bite down onto mouth portion 3. Tongue 18 further presses upwards and anteriorly into tongue depression guide 21 to press on, or squeeze, nipple 5. When feeding, the mouth serves to suck on nipple in a posterior direction (e.g. as when feeding) to pull nipple. As mouth portion is deformed, nipple 5 extends posteriorly, and skirt 27 extends outwardly.

Figure 4:
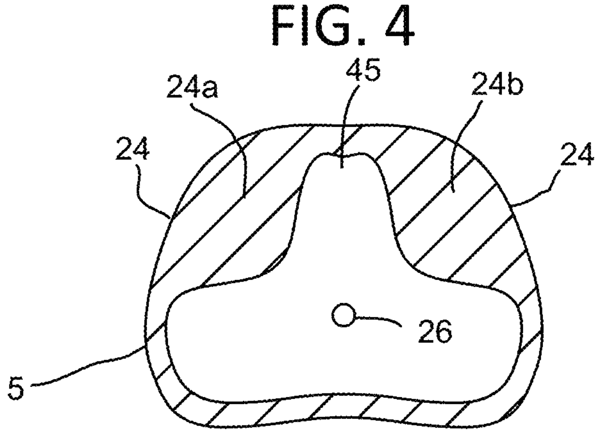
FIG. 4 illustrates a frontal view of a nipple in passive state of a bottle embodiment of the present invention.
Figure 5:
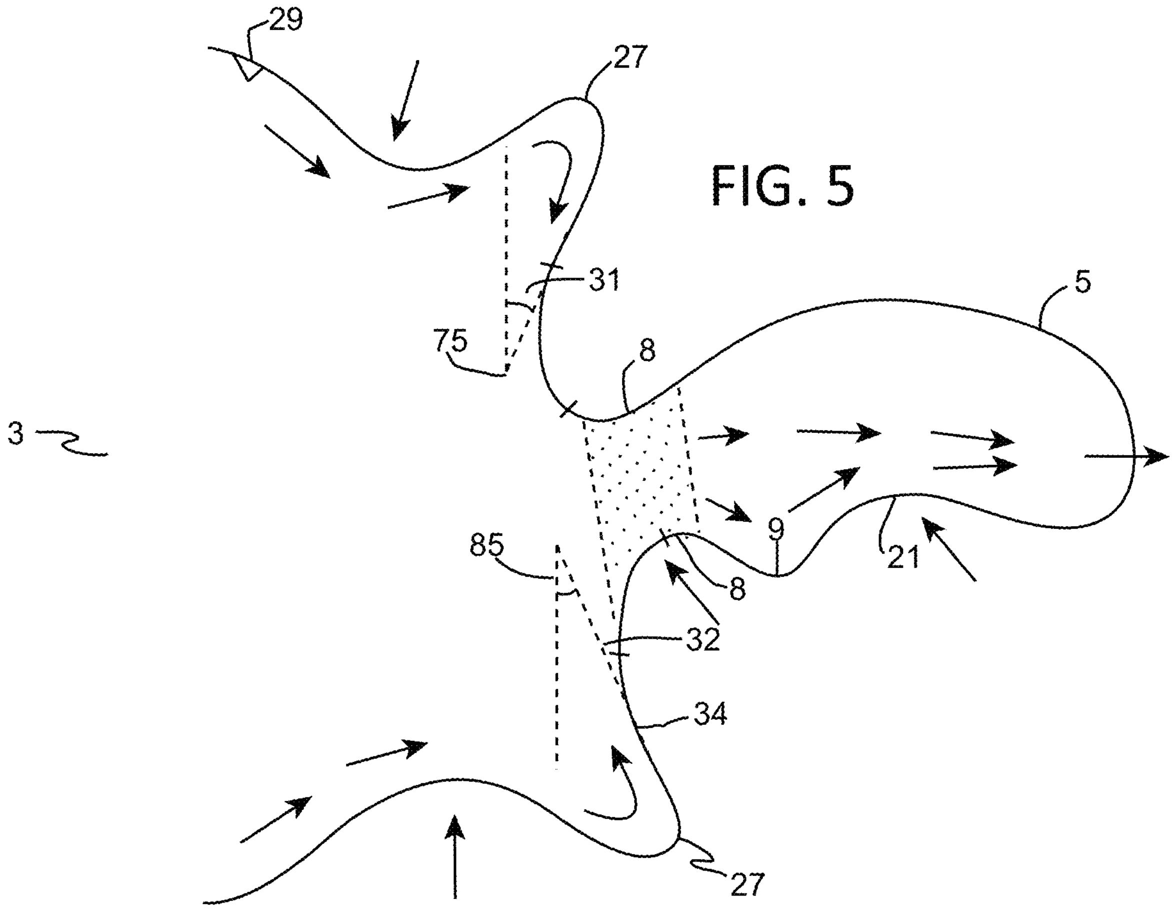
FIG. 5 illustrates a side cross-sectional view of the mouth portion in compressed state of a bottle embodiment of the present invention.
Figure 6:
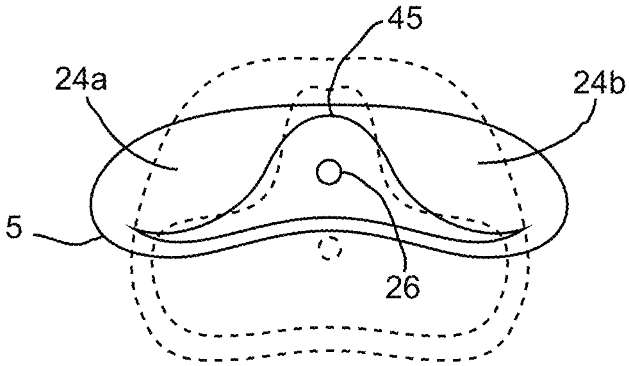
FIG. 6 illustrates a frontal view of a nipple in compressed state of a bottle embodiment of the present invention.

As can be seen in FIGS. 3-6, mouth portion 3 in passive (non-compressed) state is shown in FIGS. 3-4, while in compressed state in FIGS. 5-6. Air vent 29 is set along neck 4 in proximity to cap 2 (not shown). Major undulations 6 are shown extending at offset extending lengths, with minor undulations 7 set between major undulations 6 and collar 8. As is shown, superior and inferior collars 8 are offset by linear offset 33 which may be as much as 1-3 millimeters to from an orthotropic collar to guide jaw relationships, to optimize positioning as known in natural breast feeding, and facilitate proper orthotropic jaw development. It is contemplated that positioning the superior maxilla, forward by 1-3 millimeters in relation to the inferior mandible, proper alignment of the jaw will be formed.

Figure 28:
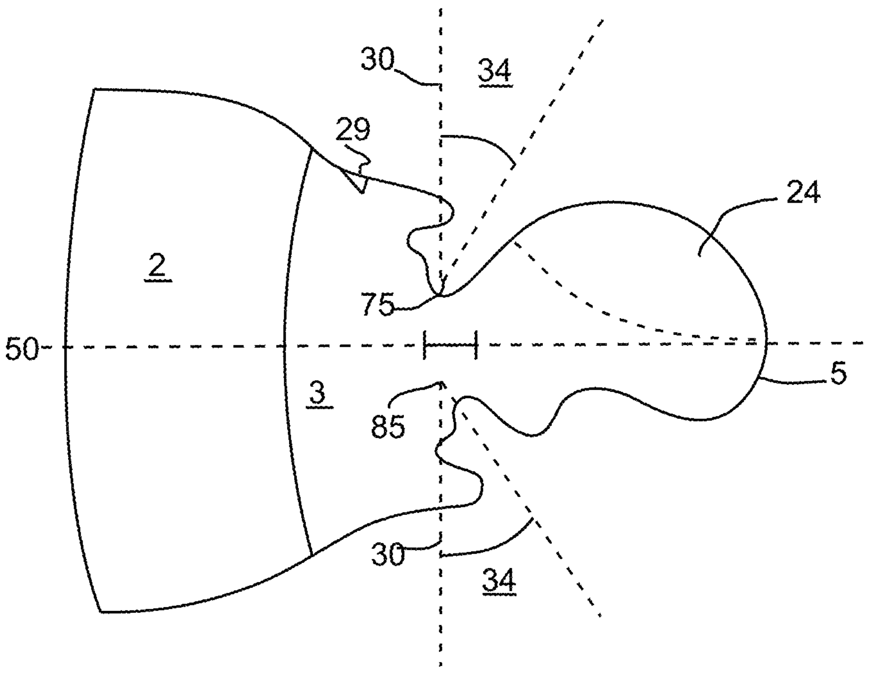
FIG. 28 illustrates a side cross-sectional view of a bottle embodiment in passive state.

As can be seen, in FIGS. 28, 28A and 28B, vertical axis 30 designates a twenty-degree angular offset above 31 and below 32, and horizontal plane 50 designates a seventy-degree offset, as the threshold angle to which the pronating alveolar ridge is abutted and stopped from further pronation. It is contemplated that the angle of the alveolar ridges when engaging the collars will limit the forward pronating angle to twenty degrees as is shown in angle 34. The angle of twenty degrees from vertical, or seventy degrees from horizontal, is preferred as the maximum orthotropic angle for forward extension of the alveolar ridges and teeth as they emerge. This is in contrast to development of pronate teeth caused by thumbsucking, etc. as is known in the art of pediatric orthodontics. Angles less than twenty degrees are preferable, while an angle between fifteen and twenty degrees is most preferable. Angles beyond twenty degrees would indicate excessive pronate tooth/ridge growth and is prevented by the extending undulations.

Figure 28A:
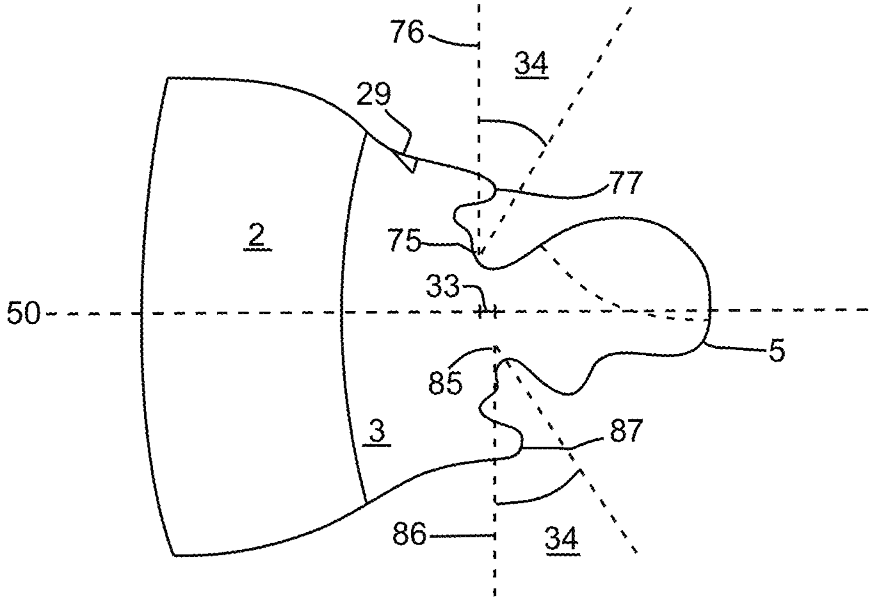
FIG. 28A illustrates a side cross-sectional view of a bottle embodiment in passive state.
Figure 28B:
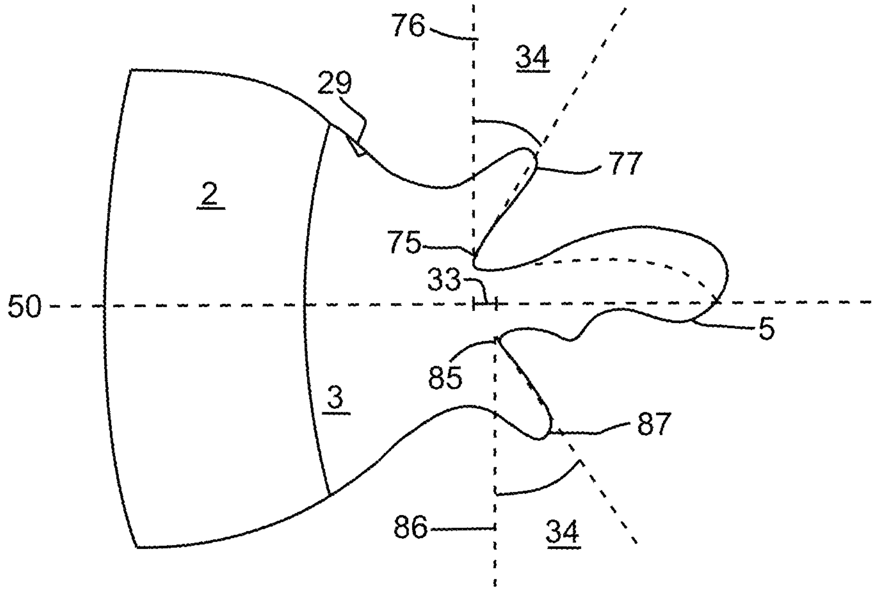
FIG. 28B illustrates a side cross-sectional view of a bottle embodiment in compressed state.
Figure 29:
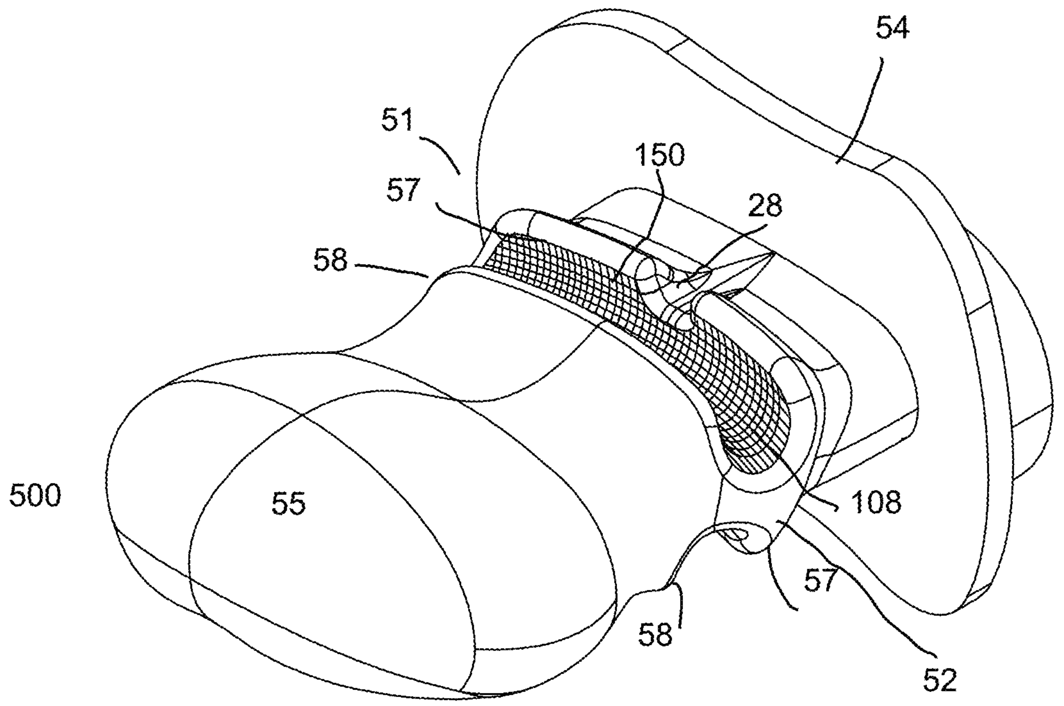
FIG. 29 illustrates a perspective view of a pacifier embodiment of the present invention.

FIGS. 28A-28B demonstrate an alternative embodiment of the present invention. In passive state, as shown in FIG. 28A, skirt 27 forms a more acute angle. Additionally, collar 8 is offset at a lower length of approximately 0-1 mm. As mouth portion 3 is exposed to compression forces, skirt 27 expands as minor undulations 7 flatten out to allow major undulations 6 to rotate and extend (so as to fill buccal vestibule). Skirt may be outfitted with surface features. Skirt 27 includes upper skirt 77, which extends to an angle of approximately twenty degrees from vertical, as defined from upper vertex 75 defining an upper vertical axis 76, and lower skirt 87, which extends to an angle of approximately twenty degrees from vertical, as defined from lower vertex 85 defining a lower vertical axis 86.

Figure 26:
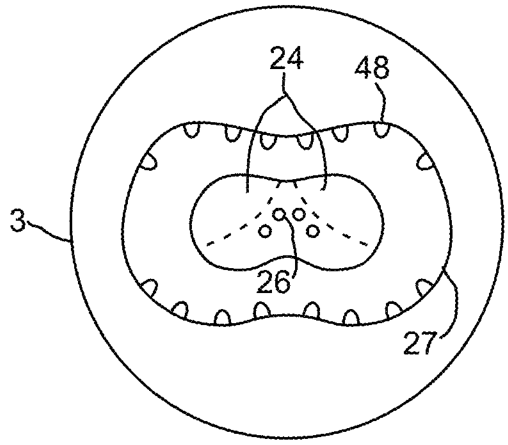
FIG. 26 illustrates a front view of a bottle embodiment in passive state.
Figure 27:
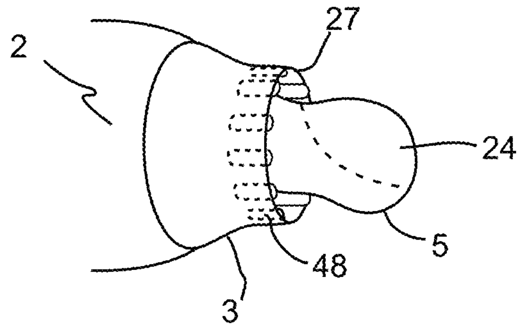
FIG. 27 illustrates a partial transparent side perspective view of an alternative bottle embodiment in passive state as applied into a human mouth.

Referring to FIGS. 26-27 frenum relief 28 is shown, the device including both superior and inferior frenum reliefs 28. Major undulation 6 are shown as are minor undulation 7, to form ribs 48.

Referring to FIGS. 4 and 6, nipple 5 may include obstructive sleep apnea (OSA) pads 24. OSA pads, referring generally to features on the bottle feed nipple and pacifier nipple, refer to integrated and/or alteration of thickness of one or more regions of the superior side of the nipple and/or nipple shell wherein one or more regions of the nipple walls/shell may include material, or be reinforced with material of at least one different durometer material as compared to another region of the nipple shell/walls. OSA pads may be integrated on the inside of one or more regions of a shell of the nipple. OSA pad(s) may be made of the same material as the rest of the nipple, or not. Different materials may be used, or different durometers of the same material, to achieve desired forces. OSA pads may include different synthetic materials to allow for greater or less elasticity or flex. The OSA pads, or the superior surface of the nipple may include a texture integrated into the upper wall of the nipple. In some embodiments, the materials of the nipple are identical throughout. In other embodiments, the materials may vary where OSA pads are integrated (e.g., in the inside upper portion of the nipple). In further embodiments, the material of the nipple may differ from the material of the shield and/or flanges, in whole or in part. Preferably OSA pads are of a higher (harder) durometer than other portions of the nipple, such as the frenum, posterior end, inferior side, lateral sides, and/or neck. While OSA pads are referred to as OSA pads, the general nature of the OSA pads causing lateral (and potentially secondary upwards) force is to provide treatment or prevention of a number of disorders associated with a raised/narrowed maxillary vault, including OSA, crowded teeth, narrow jaw, muscle disorders, etc.

The OSA pads 24, both right 24*a* and left 24*b*, are adapted to engage the maxilla of the user mouth, and apply small forces to achieve ideal orthotropic growth of maxilla. Internal padding of OSA pads provide for superior and lateral forces when engaging maxilla, and provide treatment for maxillary bone development to reduce risk and effects of obstructive sleep apnea.

OSA pads 24 may include two separate pads, as shown, and milk pore 26 may include one or more holes, or separate openings, to allow for fluid passage from bottle through nipple. OSA pads 24 are preferably thicker pads that allow lateral expansion to aid in orthotropic development of the maxilla and nasal floor. OSA pads 24 press and separate to force expansion of the maxilla. Employing lateral outward pressure on the maxilla, encourages broadening the maxilla, thus causing opening the floor of the nose. This well-developed maxilla and nasal floor provide proper aeration through the nostrils, and increases ventilation through the nose to decrease harmful issues associated with asthma and allergies. Nose breathing helps warm incoming air, filter the air, and mixes nitric oxide (a potent vasodilator) to be received by the alveoli in the lungs. This in turn causes better oxygen absorption and raises oxygen saturation in the blood. Further, with proper stretching/growth of the appropriately widened maxilla through orthotropics, the mandible will be induced to expand to a proper width as well in accordance with widening of upper teeth/ridge in maxilla. Further information on the proper development of the maxilla, oral and nasal structures can be found in article entitled *Is it Mental or Dental?Cranial & Dental Impacts on Total Health* by Dr. Raymond Silkman, DDS, published Mar. 30, 2006, published by the Weston A. Price Foundation, attached and incorporate by reference. Major undulations 6 provide for a skirt 24 surrounding nipple. Compressive forces applied (by the mouth) force down on roof of nipple as the infant feed. Compressive forces are also applied to the inferior side by the infant's tongue, and fluid is forced from pore. Superior and lateral forces on nipple/mouth portion are applied to create maxillary orthotropic forces in resistance via OSA pads, and guide better maxillary bone development. The proper bone development reduces the risk of OSA. (Note: passive state shape is shown in broken lines to mark dynamic change in mouth portion shape.) Additionally, if the OSA pads are used to exert a widening/sideways lateral outwardly force that widens the maxilla, one may prevent or treat issues wherein the vault is widened and thereby lowered reducing lift on the vomer and anterior nasal spine, thus preventing rising forces against the ethmoid bone. The lateral maxillary bones am flattened and spread, preventing upwards force on the growth of the vomer. By widening the two maxillary plates, potential growth of the vomer will reach its vertical peak without colliding with the ethmoid bone, thereby decreasing the chance of developmental deviated septum.

In all embodiments, the OSA pads may be a hard or soft solid, gel or otherwise material as known in the art for oral treatments, such as silicone, rubber, plastic, calcium, silver, zinc, or otherwise. Further, the OSA pads may be self-contained fluid sacs filled with a water, or more viscous fluid to soften the impact on the maxilla, upper palate. The OSA pads may be filled with a fluid that contains non-dissolved particles that provide for minor vibrations as the OSA pad sac is manipulated (or changes shape). Further the OSA pads may be in fluid communication with a fluid filled bladder, such that compression of the bladder forces fluid into the OSA pad sacs.

As can be seen in FIG. 3, mouth portion 3 is shown. Air vent 29 is preferably placed on superior side on the anterior edge of mouth portion 3, near where mouth portion meets cap. Minor undulations 7 provide for a zone of undulation that can stretch or otherwise add to turbulence of flowing fluid. Nipple 5 extends posteriorly from orthotropic collar 8, and further include tongue guide 21. Collar 8 includes an offset, whereby skirt superior rib 48*a* is set forward (or anterior), approximately 1-3 mm relative skirt inferior rib 48*b*. The offset of the collar and ribs is associated with proper orthognathic alignment of the jaw.

As can be seen in FIG. 5, a fluid flow design is shown. Multiple force vectors induce distortion and migration of major undulations 6 to create flaps that fill the maxillary and mandibular buccal vestibules. Air vent 29 is set outside of user lip to allow a one-way valve flow of air into the bottle so as to prevent vacuum within the bottle. Air vent is positioned in a manner that is shall be preferably on the superior side of nipple, but may be on the inferior side. Both push and pull force vectors impact the mouth portion and nipple. Push forces are provided by the compressive motions, such as lips pursing and alveolar ridges/teeth biting against the upper and lower portions of the device. Further, the tongue pressing upwards causes a push force vector against the nipple, further distorting the shape. Pull vectors are provided by the sucking and vacuum forces that draw fluid from the bottle through the pores and air into the vent. Further, pull vectors cause the nipple to extrude in a posterior direction, and may meet the roof of the mouth vault.

It is preferable that the air vent prevents fluid exiting air vent. As the force vectors engage the nipple, the lips purse against collars 8 to squeeze nipples at neck 4. Further, maxillary and mandibular alveolar ridges engage collar 8 to further squeeze nipple. Finally, sucking force induces a pull or vector force towards the throat. Sucking is supported by tongue thrust from tongue 18, preferably at tongue guide 21 on the inferior side of nipple. OSA pads 24 are forced up against the maxilla. Fluid flows out of bottle and through milk pores 26. The path of flow is guided via the shape of the nipple as it is deformed. Undulations 8 extend into vestibules causing a broadening of the nipple. Fluid flows from bottle into undulations and causes turbulence within undulations. This turbulence is preferred to prevent solids from forming, and otherwise as a hygienic cleaning function to prevent buildup of residue, or otherwise stagnant fluid. As the undulations are flushed, fluid continues to flow into nipple, in turbulent fashion until reaching release at milk pore 26. Both the repetitive swallow action and rhythmic vibrational signaling induce stem cell activity.

Major undulations 6 form a skirt 27. Nipple 5 includes tongue depression guide. The mouth portion includes air vent 29 and channel 105. Channel is set to allow screw cap 2 (not shown) to fit via fastening method over mouth portion. Preferably, cap includes an extending interior flange to fit into channel, while mouth portion is made of a flexible material that can squeeze into cap. As can be seen in FIG. 6, OSA pads 24*a* and 24*b* am set with a superior cleft 45 set therebetween. OSA pads are preferably of a thicker material, and cleft allows for relative movement of OSA pads to deform flex and bend as the nipple is deformed under pressure. Tongue depression guide 21 is shown along with a single milk pore 26. The clefting of the internal OSA pads will, upon tongue compression, cause lateral and superior loading of the two maxillary membranous bony plates.

Figure 7:
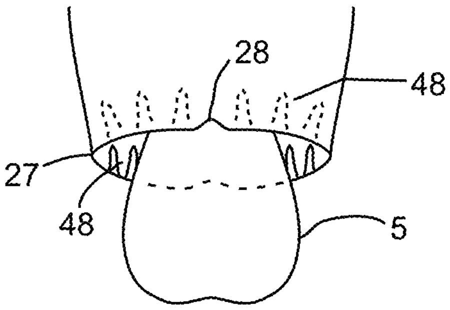
FIG. 7 illustrates a top view of a mouth portion in passive state of a bottle embodiment of the present invention.
Figure 10:
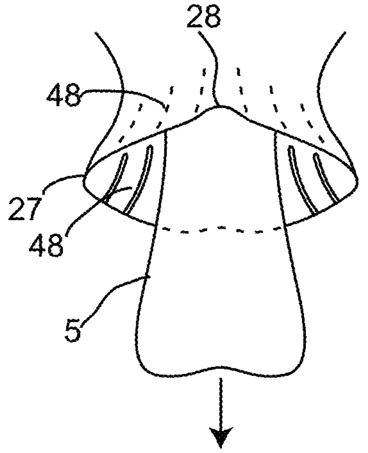
FIG. 10 illustrates a top view of a mouth portion in compressed state of a bottle embodiment of the present invention.
Figure 8:
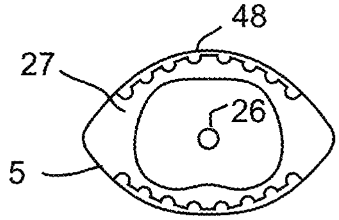
FIG. 8 illustrates a frontal view of a nipple and skirt in passive state of a bottle embodiment of the present invention.
Figure 11:
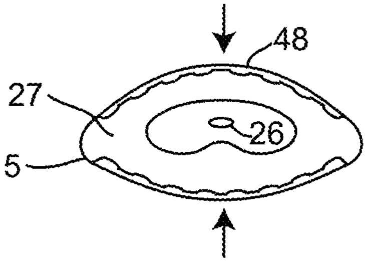
FIG. 11 illustrates a frontal view of a nipple and skirt in compressed state of a bottle embodiment of the present invention.
Figure 12:
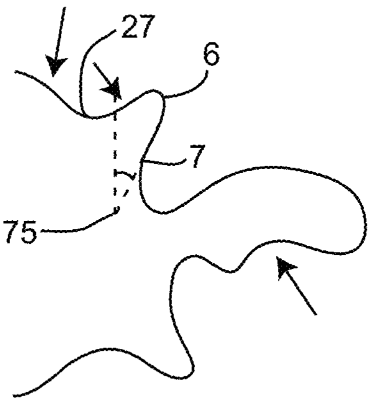
FIG. 12 illustrates a cross-sectional side view of a skirt and collar in compressed state a bottle embodiment of the present invention.
Figure 9:
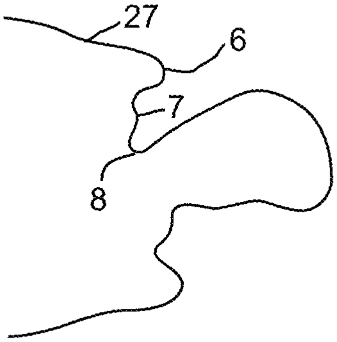
FIG. 9 illustrates a cross-sectional side view of a skirt and collar in passive state a bottle embodiment of the present invention.

Various shapes of the mouth portion 3 are shown in FIGS. 7-12. FIGS. 7-9 show the mouth portion in passive state (when equilibrium forces are set upon system). Skirt 27 includes frenum relief 28 to engage with the user's mouth. Skirt 27 is shown closed, and nipple 5 is intruded. Major undulations 6 form skirt 27. Major undulations 6 and minor undulations 7 forms ribs 48. Skirt may form a flat angle at rest. FIGS. 10-12 show the system in compressed form. Nipple 5 is extended (posteriorly) forced by compressive forces and/or sucking vacuum (pull) forces. Skirt 27 flares out as neck 4 is squeezed by lips to provide lateral opening of skirt. Nipple 5 stretches and extrudes. Ribs 48 are also stretched and reach a low angle profile. When ribs and skirt flare out, skirt fills buccal vestibule. Skirt increases in height, narrows (as minor undulations flatten), and turns upright. Skirt 27 also provides a bumper of sort to help guide orthotropic angle of alveolar ridge—preventing excessive pronation. Skirt may form a high angle, approximately twenty degrees, preferably to manage pronation of teeth, as discussed herein.

Figure 21:
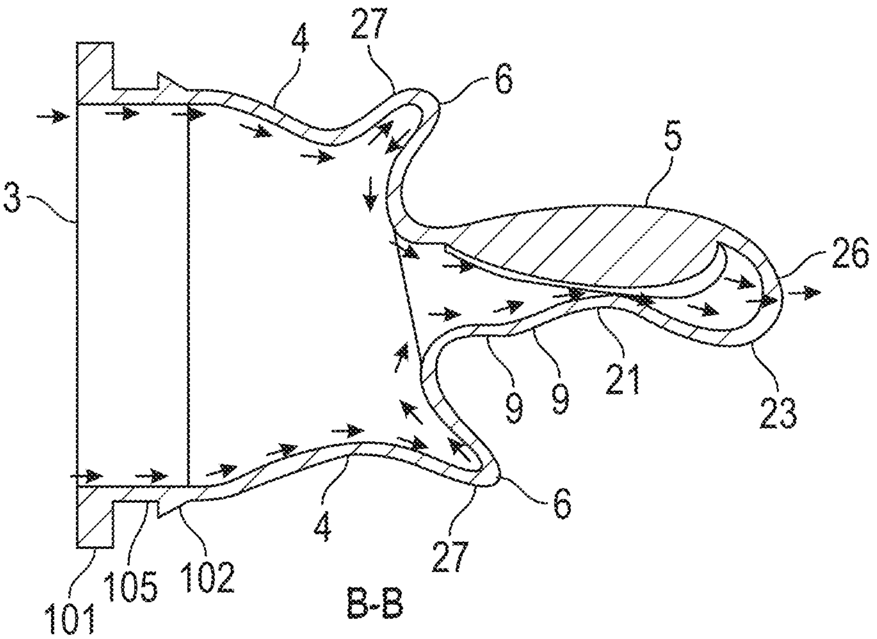
FIG. 21 illustrates a side cross-section view along lines BB of FIG. 16 as when the mouth portion is in a compressed state.
Figure 22:
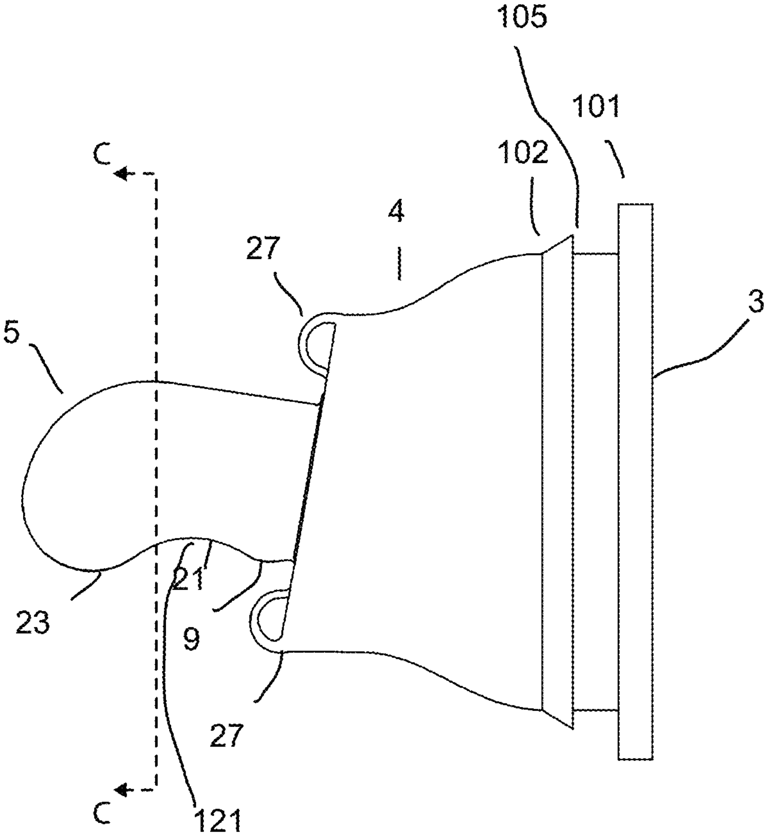
FIG. 22 illustrates a side view of a mouth portion of a bottle embodiment of the present invention.
Figure 23:
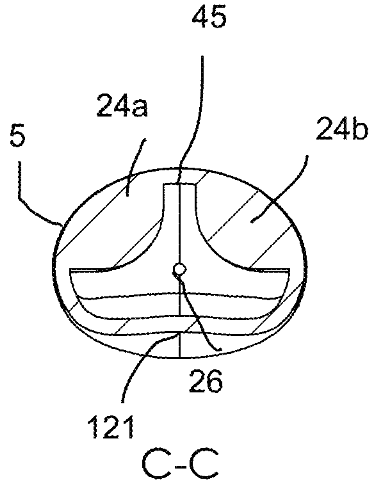
FIG. 23 illustrates a front cross-sectional view along lines C-C of FIG. 22 in passive state.
Figure 24:
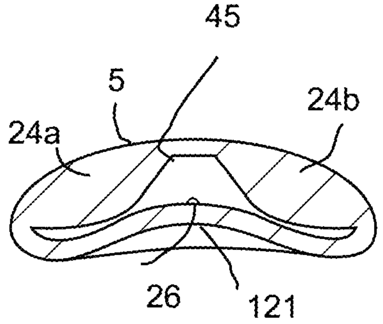
FIG. 24 illustrates a front cross-sectional view along lines C-C of FIG. 22 in compressed state.

Mouth portion 3 is shown in isolation for further detail of an embodiment of the present invention in FIGS. 15-24. Mouth portion 3 includes circumferential features on anterior side, including edge flange 101 and secondary flange 102 forming channel 105. Channel 105 mates with interior flange in cap (not shown) to provide a flexible, yet water-tight seal when mouth portion applied to cap. Skirt 27 forms with major undulations 6. It is preferred that an even number of major undulations 6, and ribs 48, are formed with a center gap 46 set therebetween on both superior and inferior sides. Nipple 5 includes pore 26, or pores in alternative embodiments. Skirt 27 defines side edges 47, absent of undulations. Nipple 5 includes tongue depression guide 21 on the underside of nipple as a son of lingual hemi-torus. Tongue depression guide 21 forms an inverse saddle point 121 (mathematical) whereby a local maximum is formed in the underside surface of nipple towards center of tongue guide 21. Mouth portion 3 may include interior separator 90, that can function to provide fluid impermeable material to prevent flow of fluids from bottle. Separator 90 is preferably planar and extended along interior surface of mouth portion. One or more one-way fluid valves 91 may be employed to function both as a one way valve to prevent flow of fluids back into bottle as nipple is depressed, and further serve to cause movement of fluids into nipple to follow paths around perimeter of mouth portion to cause specific flow paths. One-way fluid valves increase fluid pressure in the nipple chamber after the first suction event occurs to retain fluid in the nipple and thereby maintain pressure via OSA pads against maxilla. One-way fluid valves 91 are preferably set along interior edge 92 of mouth portion at perimeter. Further, OSA pads 24 are set preferably within (as shown, or part of the features of the nipple shell, or less preferably on the exterior surface of nipple shell (not shown)). As shown in FIG. 23-24, nipple 5 moves from passive state (FIG. 23) to compressed state (FIG. 24). Tongue guide 21 is forced upwards and further distorts nipple to cause OSA pads 24*a* and 24*b* apart. (Superior) cleft 45 allows for mechanical separation and rotation of OSA pads. As shown in FIG. 21, fluid flow path is indicated by arrows, fluid entering mouth portion 3, passing through skirt (causing interior flushing/cleaning and causing vibrations) around OSA pad 24 and out pore 26.

Figure 25:
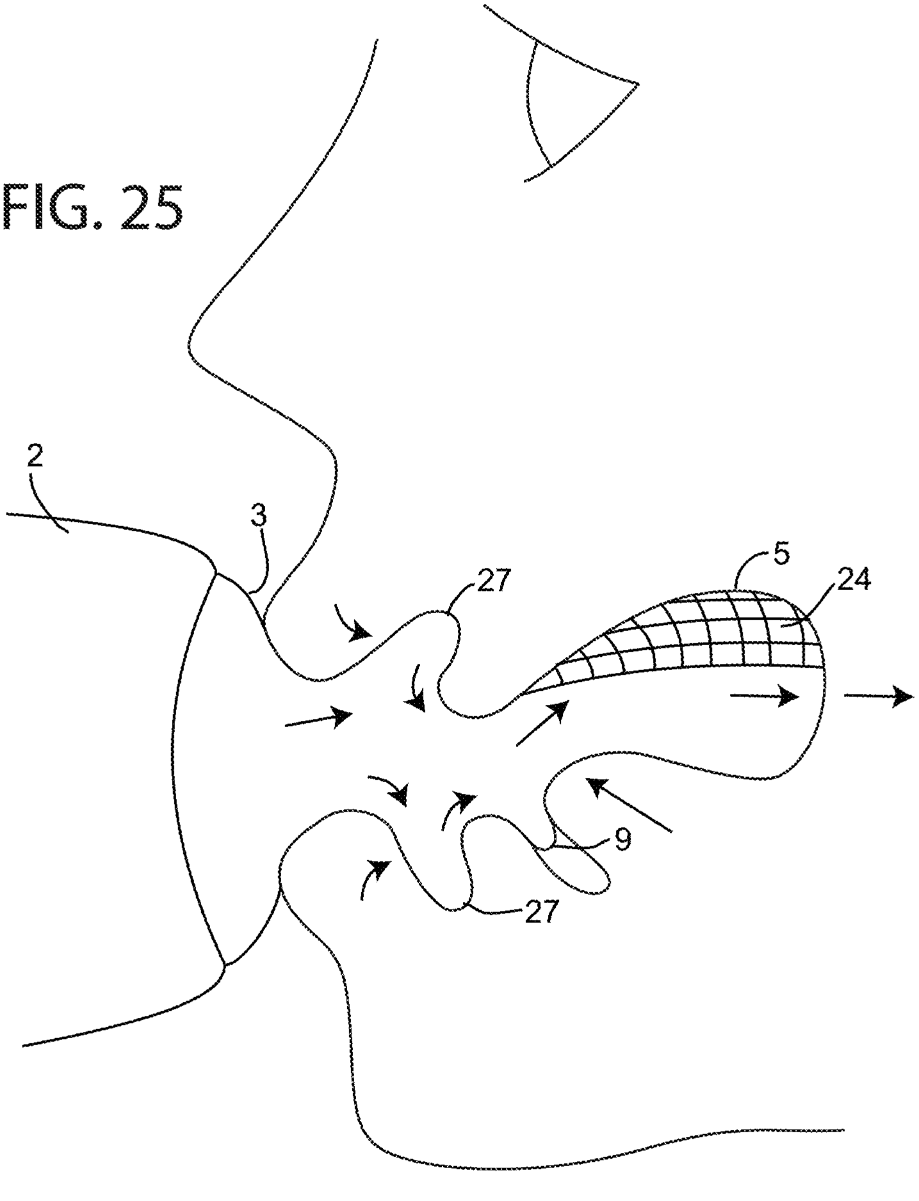
FIG. 25 illustrates a side cross-sectional view of a bottle embodiment in compressed state with force vectors of flow and external pressures.

FIG. 25 further demonstrated the multiple force vectors caused when in use by user's mouth to distort and reshape mouth portion 3 on cap 2. Force vectors induce distortion and migration of skirt (or flaps) and also produce turbulence of flow through mouth portion 3. Pursing of lips 10 and 11 around neck 4 cause compressive force. Alveolar ridges 12 and 13 bite down on collar 8. Tongue 18 provide thrust up against tongue guide 21 and compresses against maxilla vault 20.

Figure 30:
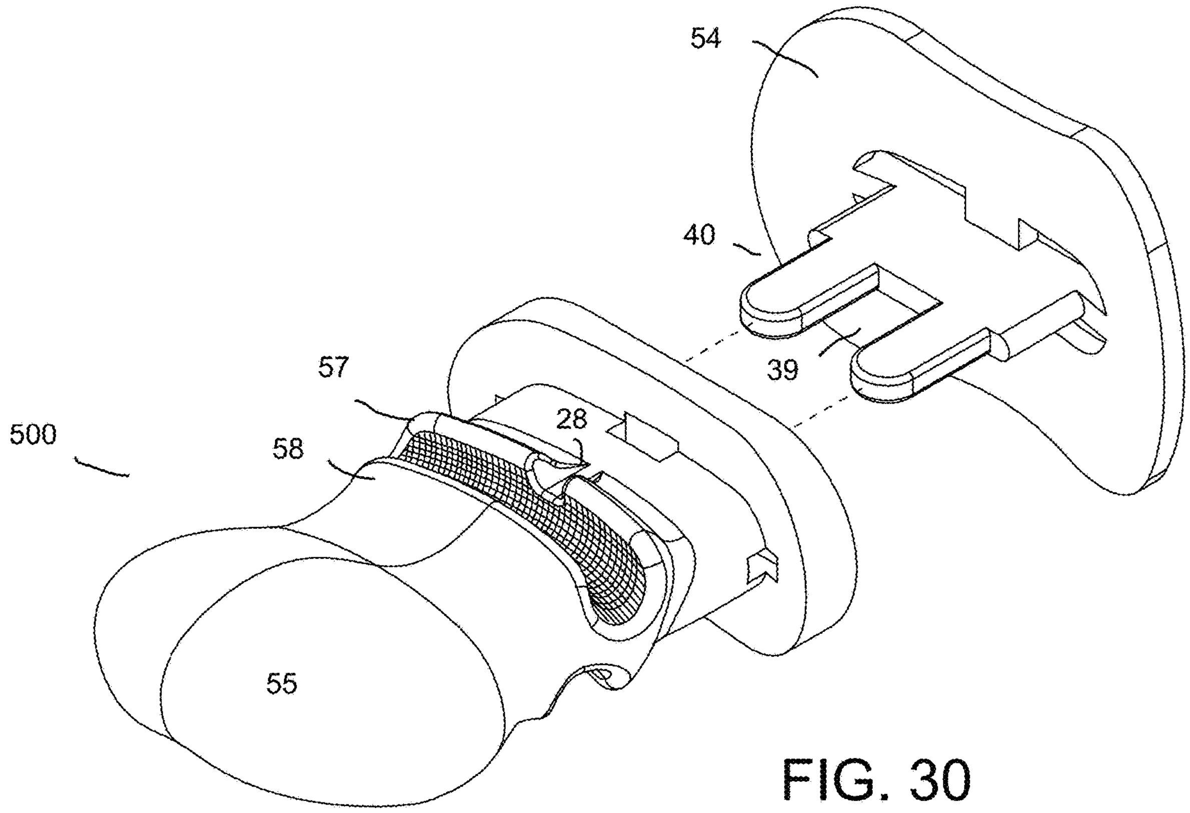
FIG. 30 illustrates a perspective exploded view of a pacifier embodiment of the present invention.
Figure 31:
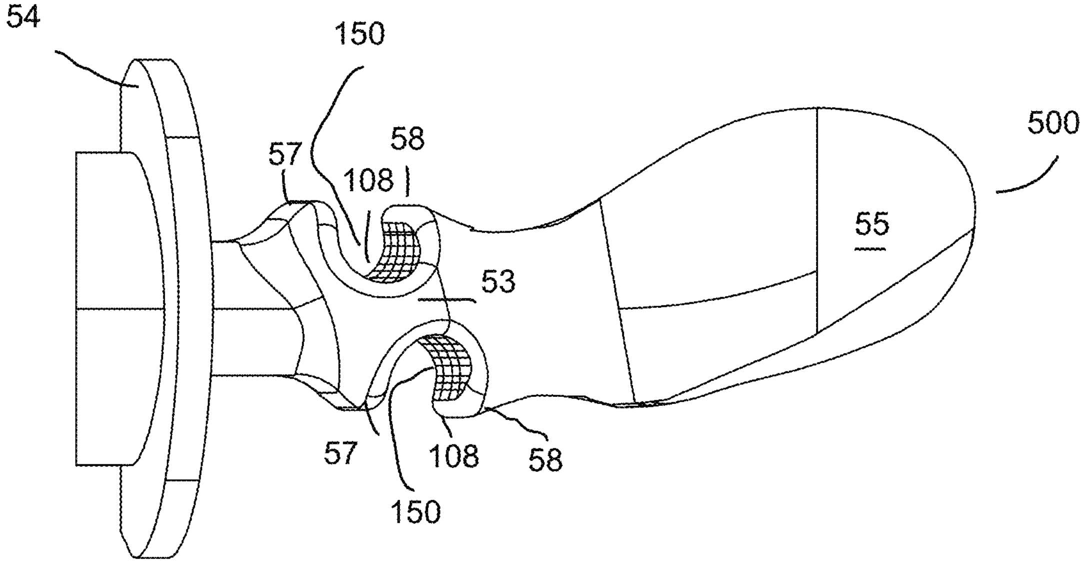
FIG. 31 illustrates a side view of a pacifier embodiment of the present invention.
Figure 32:
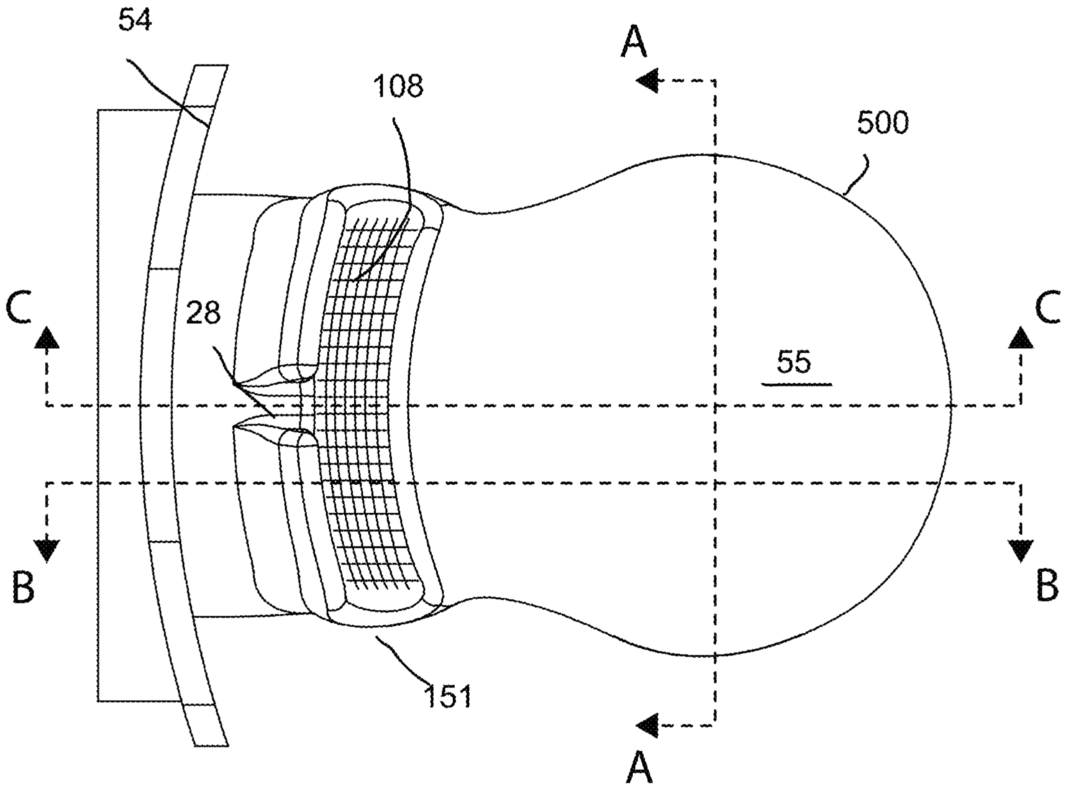
FIG. 32 illustrates a top view of a pacifier embodiment of the present invention.
Figure 33:
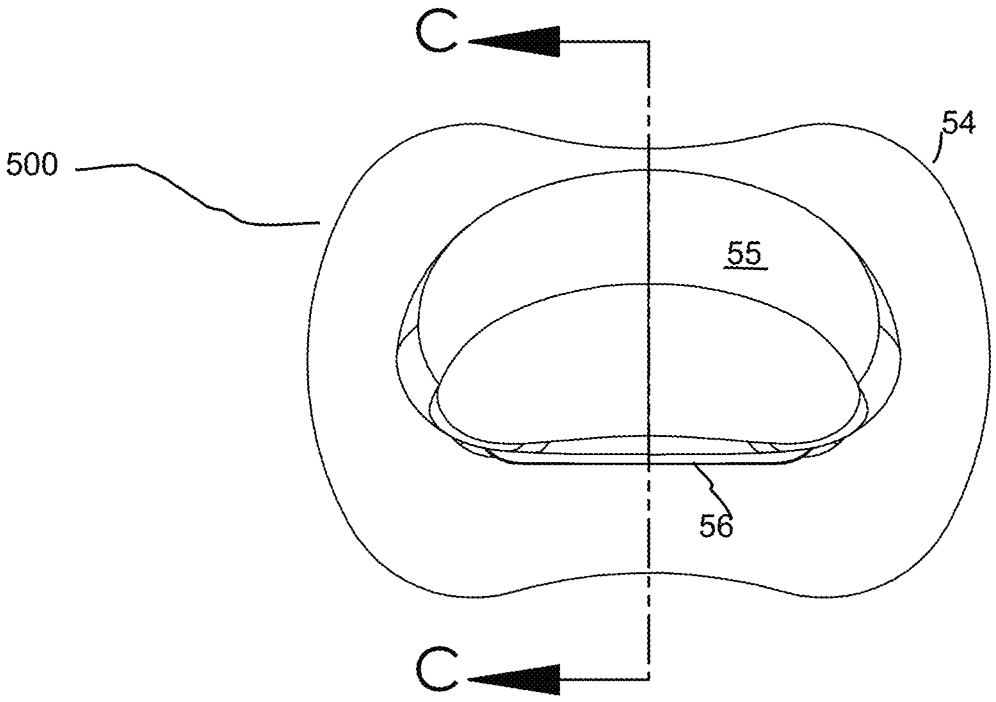
FIG. 33 illustrates a front view of a pacifier embodiment of the present invention.

Pacifier embodiments of the present invention are shown in FIGS. 29-42. Pacifier 500 includes superior collar 51 and inferior collar 52. A side wall 53 may separate superior and inferior collars. Shield 54 is shown as is known in the art to engage with the outer lip of user. Nipple 55 extends to the distal end, and may include a tongue depression 56. Flanges 57 and wings 58 are set on the upper and lower portion of the pacifier. Further, maxillary frenum indentation may be set along the center line to allow for relief for the frenum. As between flanges and wings, a textured surface 150 is placed and intended to make contact with alveolar ridges and otherwise contact vestibules for hygienic, cleaning, and stimulation. Texture provides for cleaning, and stimulation of the gums and alveolar ridges. In a similar manner, in the bottle embodiment, vibrational forces by flow cause undulations to stimulate the vestibules and alveolar ridges. OSA pads 59 may be set on the superior side of nipple, opposite tongue depression 56. Cleft, or ceiling gap 62 is set as between OSA pads 59*a* and 59*b*. Frenum relief 28 maybe present on superior and inferior sides. Trench 108 is set on both superior and inferior sides between flanges 57 and wings 58, with sides 151 set on each side, flanges (and wings) are adapted to bulge and extend when fluid from nipple 55 passes into flanges. As seen in FIG. 30, shield 54 is connect to bite block 40 with passage 39 set therein to allow for fluid flow from nipple 55 into flanges 57.

Figure 34:
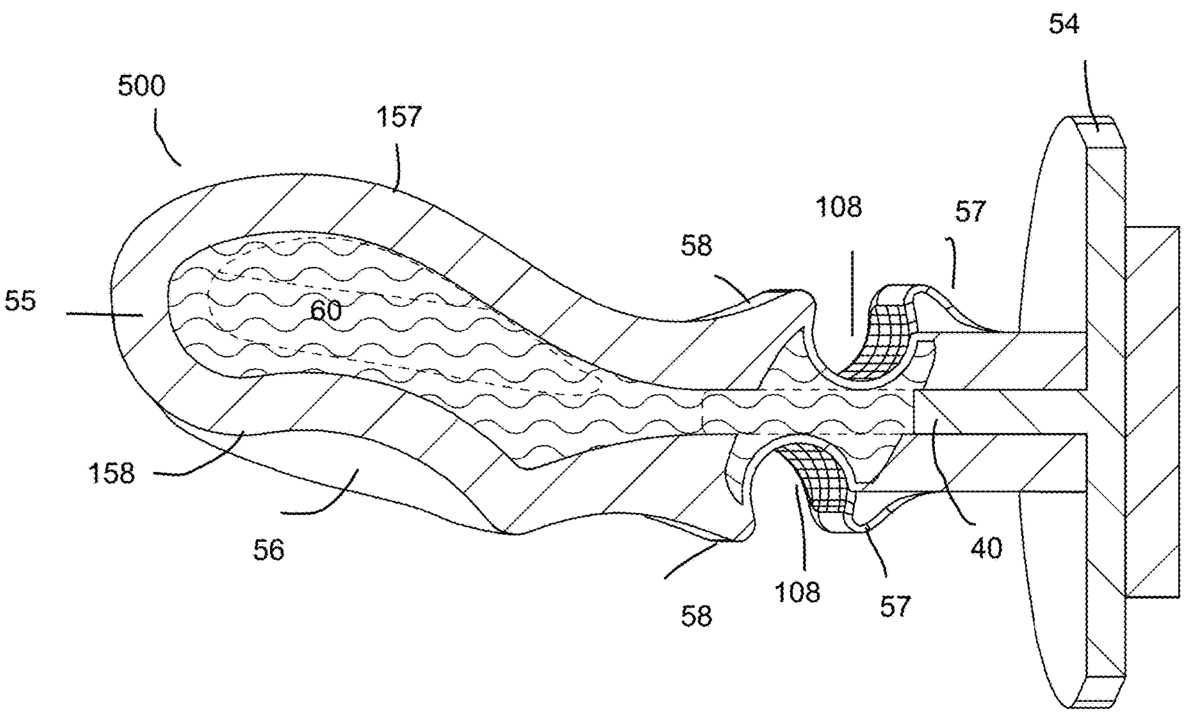
FIG. 34 illustrates a cross-sectional side view along lines C-C of FIG. 33.
Figure 35:
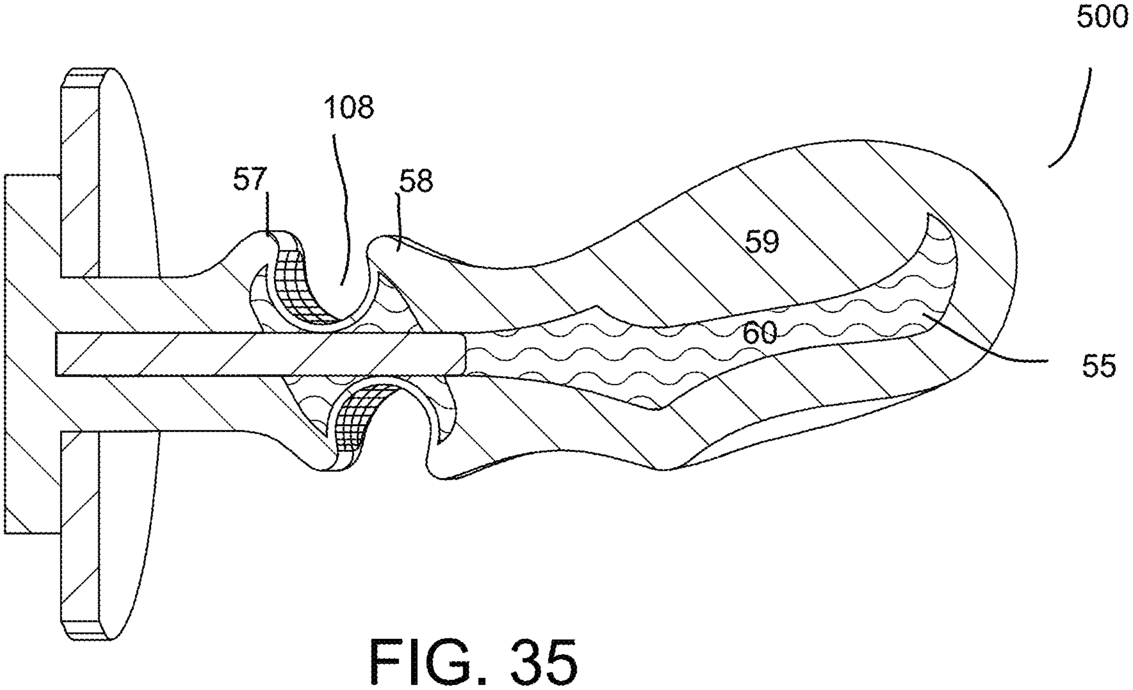
FIG. 35 illustrates a cross-sectional side view along lines B-B of FIG. 32 in passive state.
Figure 36:
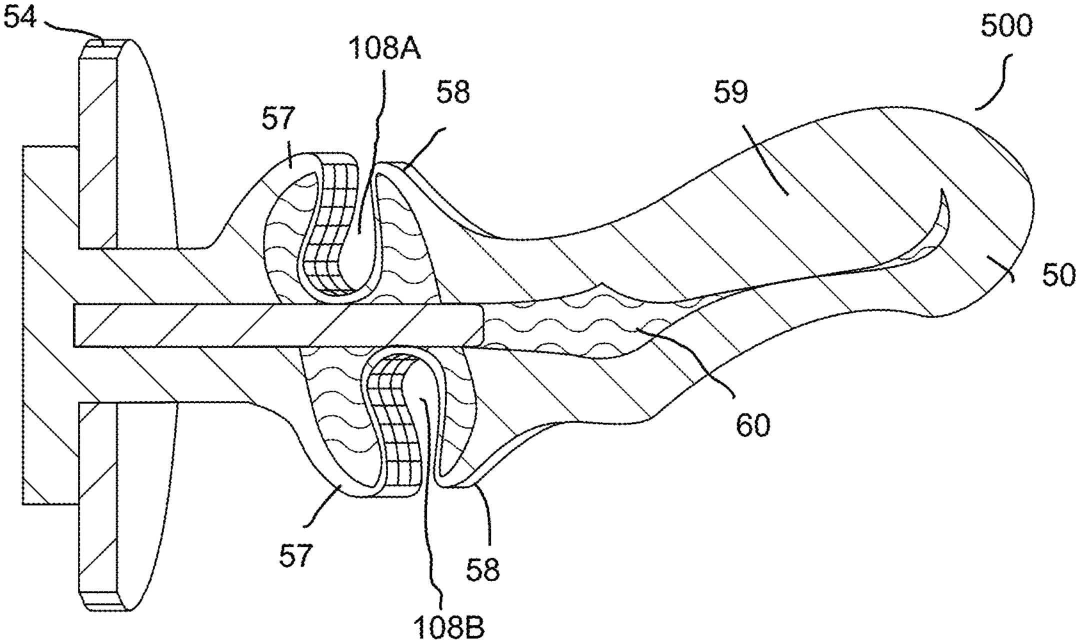
FIG. 36 illustrates a cross-sectional side view along lines B-B of FIG. 33 in compressed state.
Figure 37:
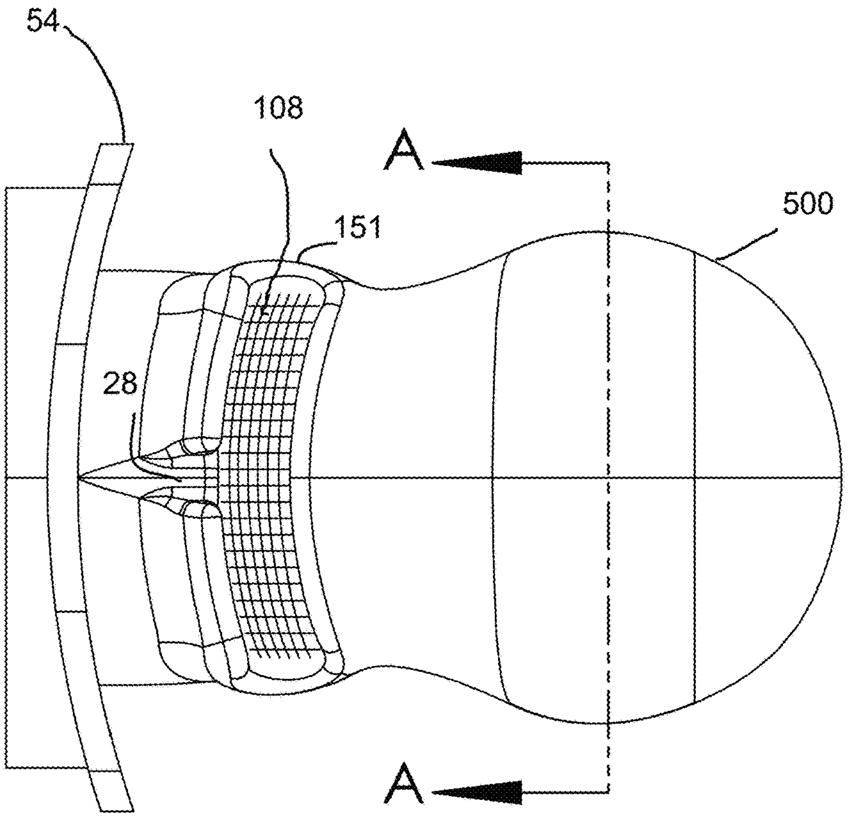
FIG. 37 illustrates a top view of an alternative pacifier embodiment of the present invention.
Figure 38:
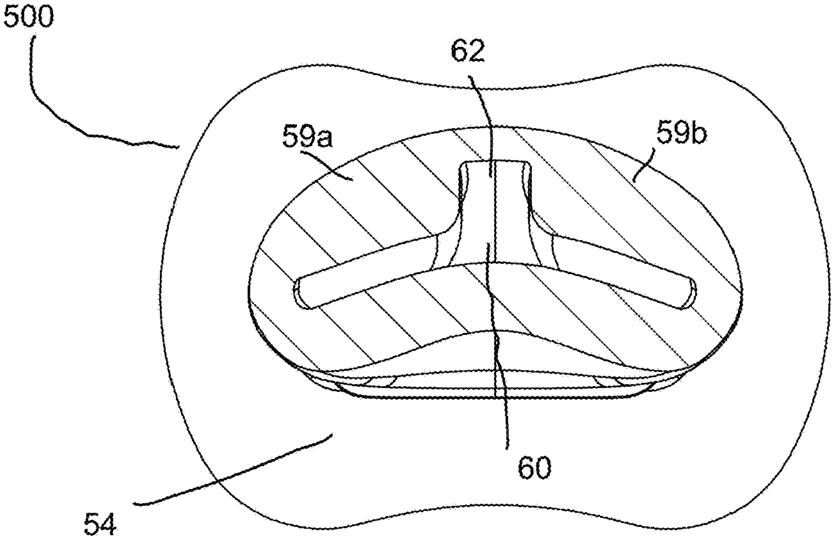
FIG. 38 illustrates a cross-sectional side view along lines A-A of FIG. 32.
Figure 39:
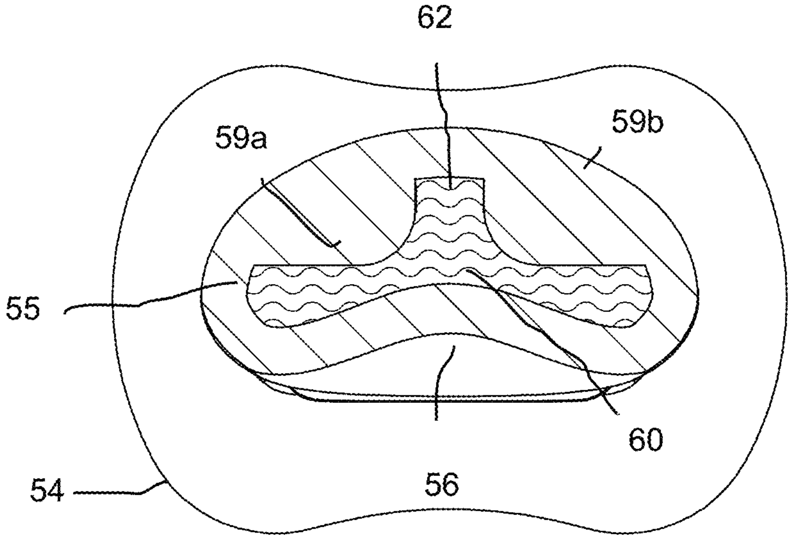
FIG. 39 illustrates a cross-sectional side view along lines A-A of FIG. 37 in passive state.
Figure 40:
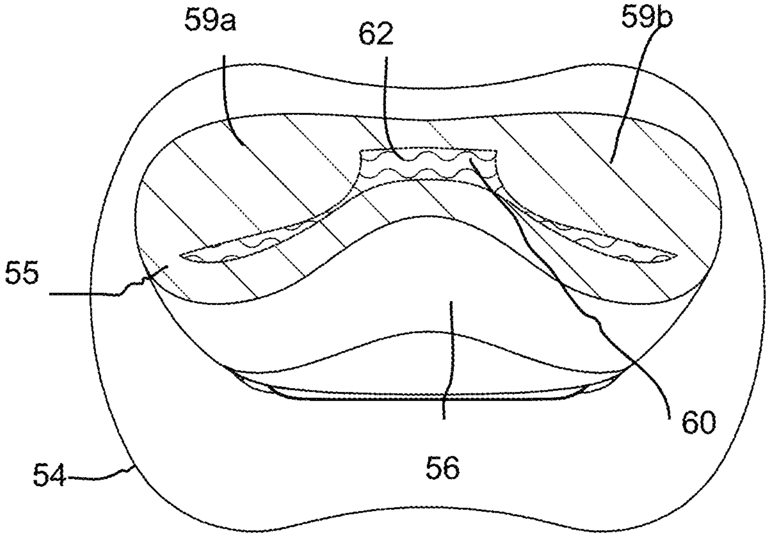
FIG. 40 illustrates a cross-sectional side view along lines A-A of FIG. 37 in compressed state.
Figure 41:
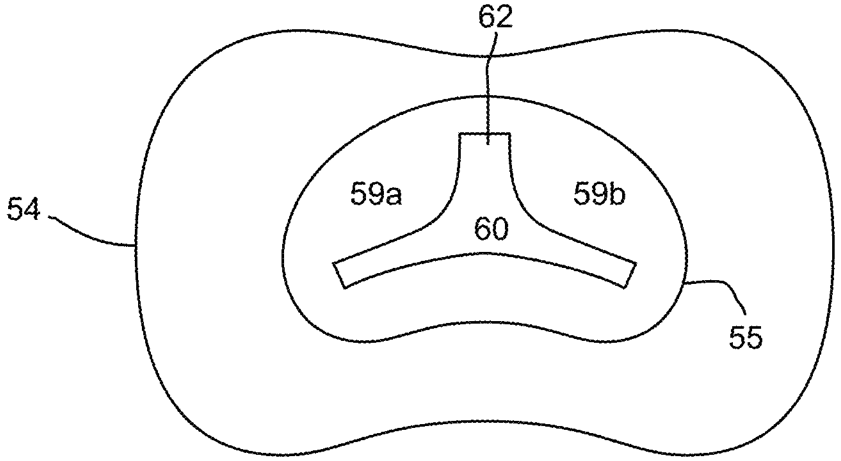
FIG. 41 illustrates a cross-sectional side view along lines A-A of FIG. 32 in passive state.
Figure 42:
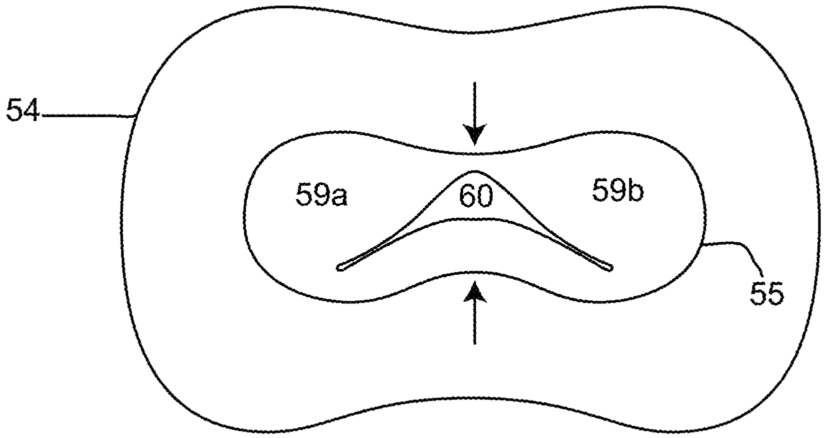
FIG. 42 illustrates a cross-sectional side view along lines A-A of FIG. 32 in compressed state.
Figure 43:
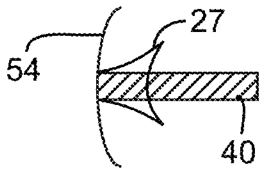
FIG. 43 illustrates a top view of an alternative bite block of an embodiment of the present invention.
Figure 44:
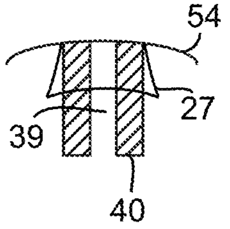
FIG. 44 illustrates a top view of an alternative bite block of an embodiment of the present invention.
Figure 45:
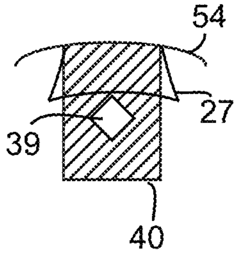
FIG. 45 illustrates a top view of an alternative bite block of an embodiment of the present invention.
Figure 46:
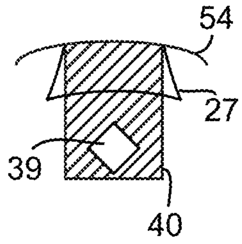
FIG. 46 illustrates a top view of an alternative bite block of an embodiment of the present invention.
Figure 47:
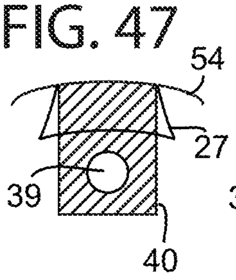
FIG. 47 illustrates a top view of an alternative bite block of an embodiment of the present invention.
Figure 48:
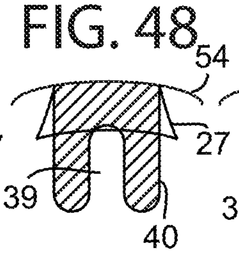
FIG. 48 illustrates a top view of an alternative bite block of an embodiment of the present invention.
Figure 49:
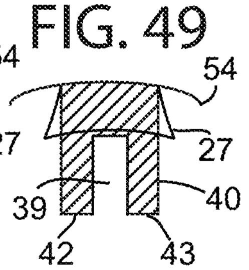
FIG. 49 illustrates a top view of an alternative bite block of an embodiment of the present invention.
Figure 50:
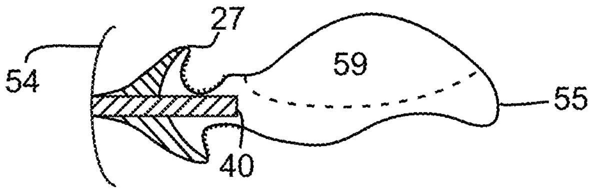
FIG. 50 illustrates a side cross-sectional view of a pacifier embodiment of the present invention.

As can be seen in cross-sectional view FIGS. 34-36, nipple 55 includes OSA pads 59 on right and left side with central ceiling gap 62 set therebetween within cavity 60. Pacifier is preferably hollow, or filled with a fluid, or gas, or otherwise within cavity. As the nipple is under pressure, the nipple collapses forcing fluid in cavity to extend into flanges, and in some embodiments, wings. OSA pads move relative to one another and exert pressure against maxilla. It is preferable that the interior side of OSA pads 59 include a filleted edge with rounded corners.

Nipple 55 includes tongue depression 56. Tongue depression may include features posterior that hang below depression to form a circular, oval, egg, or similar round feature to guide tongue onto inferior side 158 of nipple. OSA pads 59 fit on superior side 157 of nipple 55 over cavity 60. Flanges 57 and wings 58 are set therein with a bite block 40 separating inferior and superior sides, 158 and 157, respectively. Bite block includes some aperture or gap to allow fluid to flow from nipple into flanges when pressure is exerted from teeth or alveolar ridges. While prior art has been known to modify the shape or orientation of flanges within a pacifier, prior art is limited to relying solely on pull vectors, or sucking to pull on the device to modify the shape. In embodiments of the present invention, push vectors, such as squeezing of the lips, alveolar ridges, and pressing the tongue against the vault all may be used to cause deformation of the device so as to extend the flanges into the buccal vestibule(s). OSA pads 59 are of a thicker cross-section, as opposed to the central ceiling gap 62.

Feeding embodiments include the skirt, with ribs and rib undulations. A bite collar is preferred as a portion to allow the alveolar ridges and/or lips to rest OSA pads are features inside or along the outside portion of nipple, and may interface, or interact, with the maxillary and other oral tissues. An internal cleft is used to allow proper alignment and rotation of OSA pads, or movement of pads relative one another to facilitate outwards pressures. A lingual donut is formed via tongue depression guide to encourage placement of the tongue under the nipple to ensure proper use of the nipple. Tongue depression guide facilitates posterior end of nipple with pore to move deeper into the throat, and causes OSA pads to extend back to posterior maxilla to allow OSA features to work to spread the maxillary plates. Frenum reliefs allow for enhanced ergonomic use. Bottle mouth portion allows fluid to flow from bottle and through pore in a manner to cause rhythmic vibrations to the oral surfaces that causes vibrational signaling to enhance or stimulate stem cell induction. Bottle (and pacifier) include orthotropic jaw relationships by both causing the relative location of upper and lower jaws at bite collar, and facilitating the forward development of the alveolar region at a forward angle relative the vertical (preferably about 10-30 degrees, and most preferably at twenty degrees) to cause the teeth to grow angles forward in an appropriate angle. The OSA pads, or hard high durometer sections provide for orthotropic maxillary guidance.

As can be seen in FIGS. 43-50, portions of pacifier embodiments, such as a bite block of preferred embodiment of the present invention are shown. Shield 54 is set on distal end while nipple extends towards proximal end. Superior flange 27 is shown for reference. Bite block 40 is preferably made of a flexible yet, preferably somewhat stiffer material than nipple. In some embodiments, same material may be used for both nipple and bite block. An alternative embodiment nipple may be flexible, while bite block may be made of a much harder plastic or other material. Bite block may include right bar 42 and left bar 43 with flow passage set therebetween. In other embodiments, bite block may be made of a single form with an aperture set therein. The aperture may be of any shape, here shown as a square or circle. Furthermore, right and left bars 42 and 43 may be of any shape so long as flow passage remains therebetween.

Figure 51:
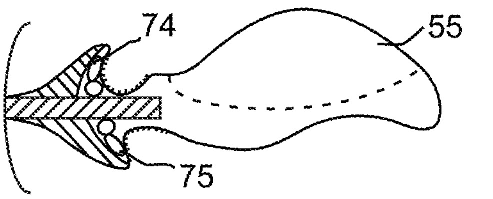
FIG. 51 illustrates a cross-sectional view of a pacifier embodiment of the present invention.
Figure 53:
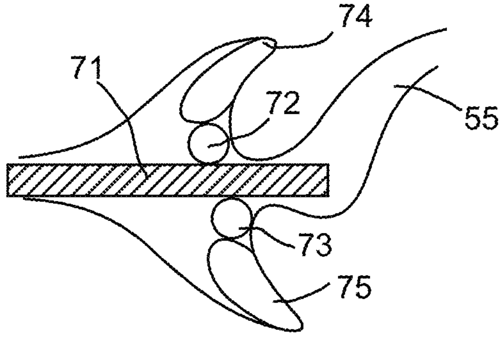
FIG. 53 illustrates a cross-sectional view of flanges along plane lines E-E in FIG. 52.
Figure 52:
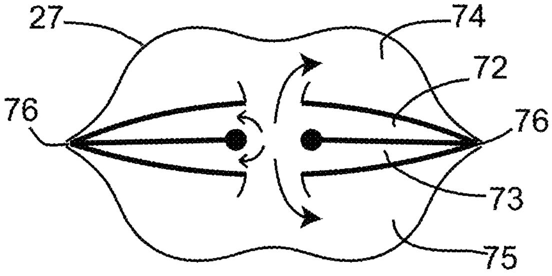
FIG. 52 illustrates a cross-sectional view of flanges along plane lines F-F in FIG. 51.
Figure 54:
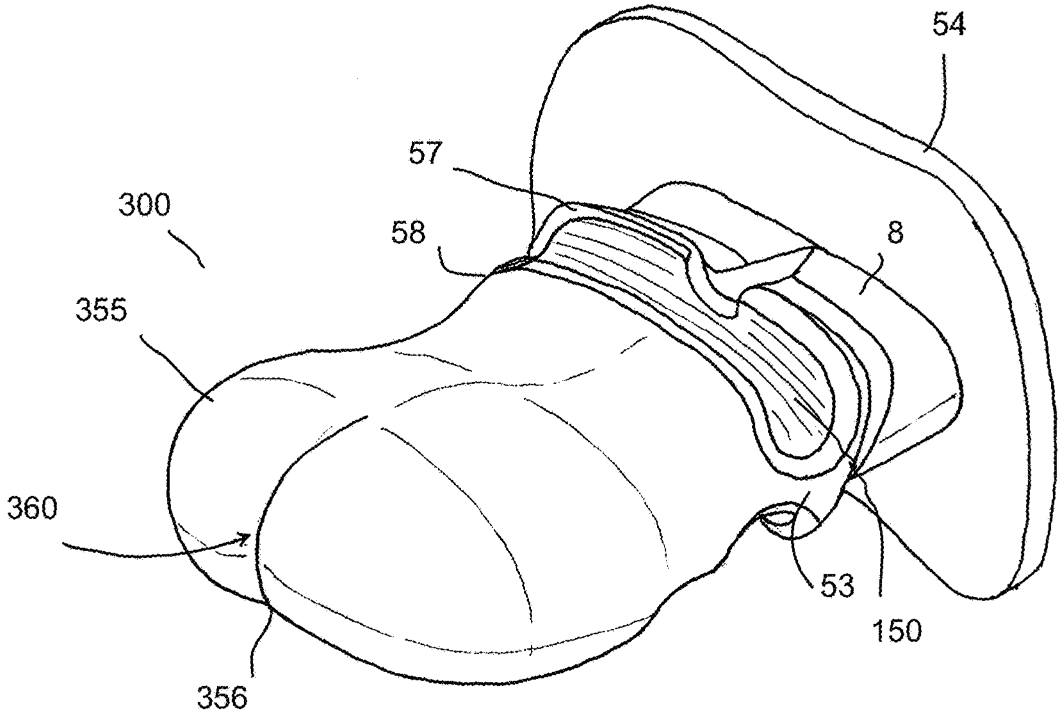
FIG. 54 illustrates a front perspective view of a pacifier embodiment in resting shape of the present invention.
Figure 55:
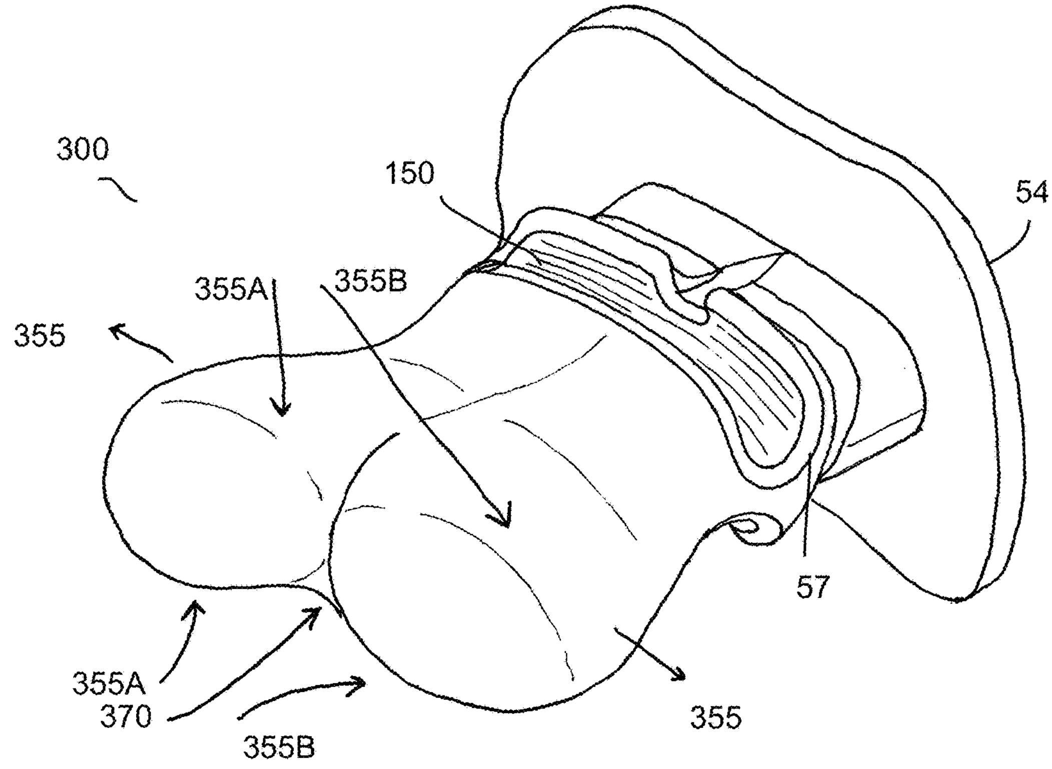
FIG. 55 illustrates a front perspective view of the pacifier embodiment of FIG. 54 in extended shape.
Figure 56:
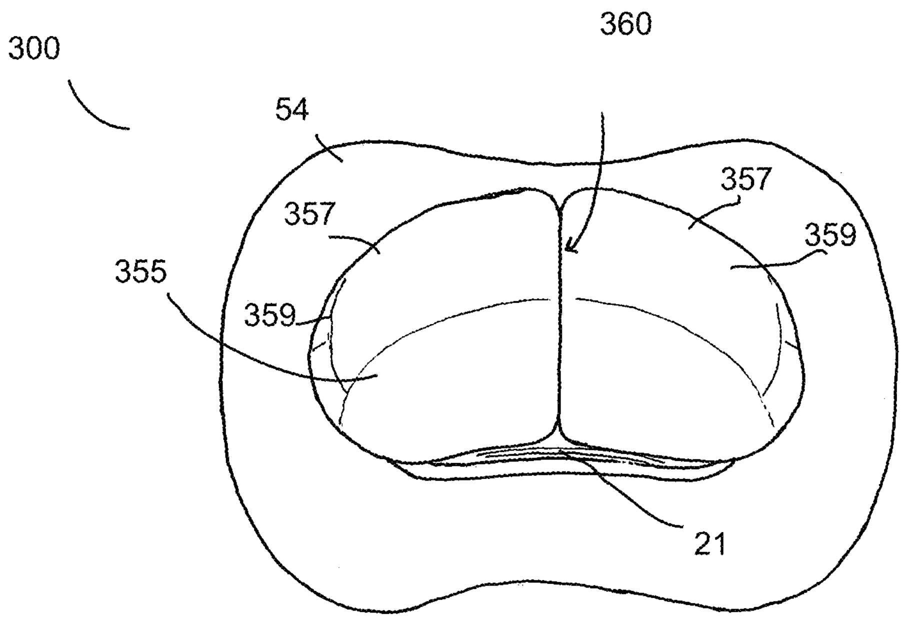
FIG. 56 illustrates a front plan view of the pacifier embodiment of FIG. 54 in resting shape.
Figure 57:
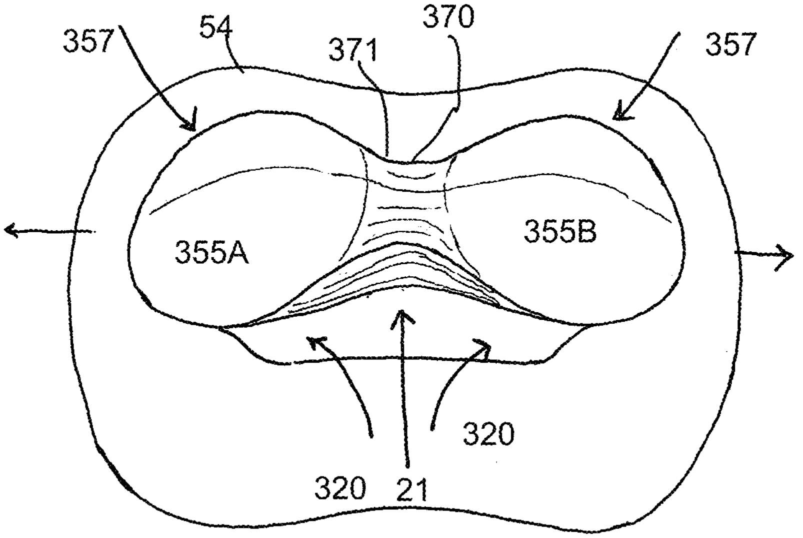
FIG. 57 illustrates a front plan view of the pacifier embodiment of FIG. 54 in extended shape.
Figure 58:
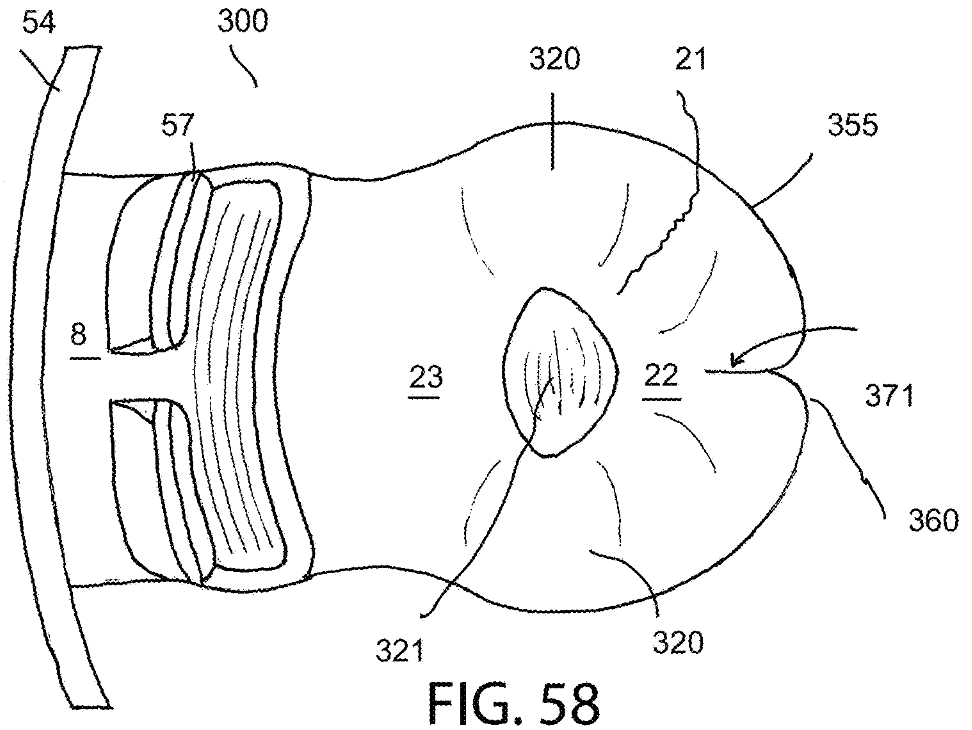
FIG. 58 illustrates a bottom plan view of the pacifier embodiment of FIG. in resting shape.
Figure 59:
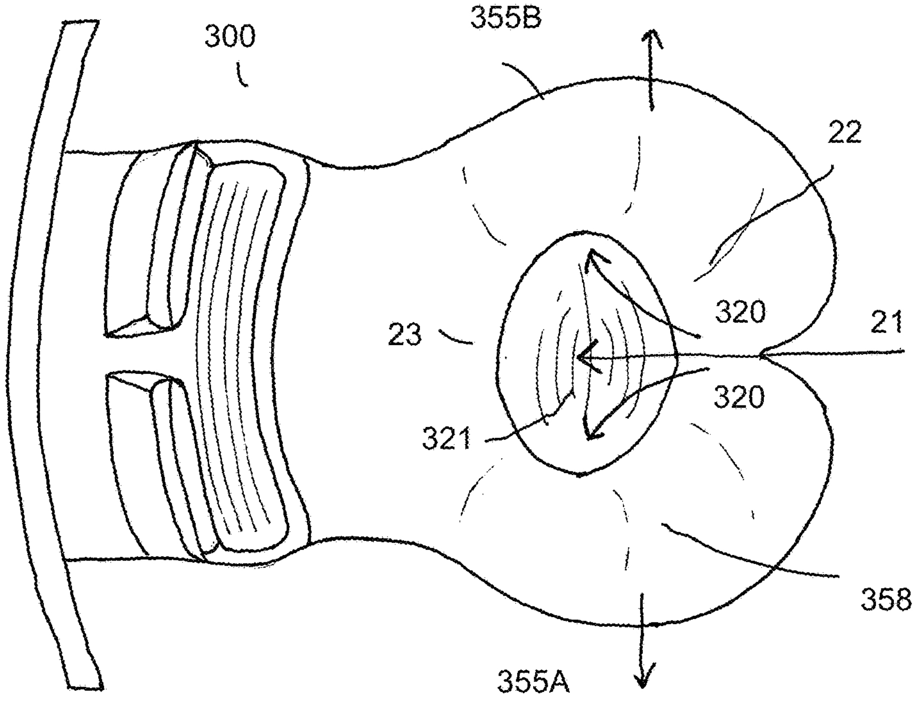
FIG. 59 illustrates a bottom plan view of the pacifier embodiment of FIG. 54 in extended shape.
Figure 60:
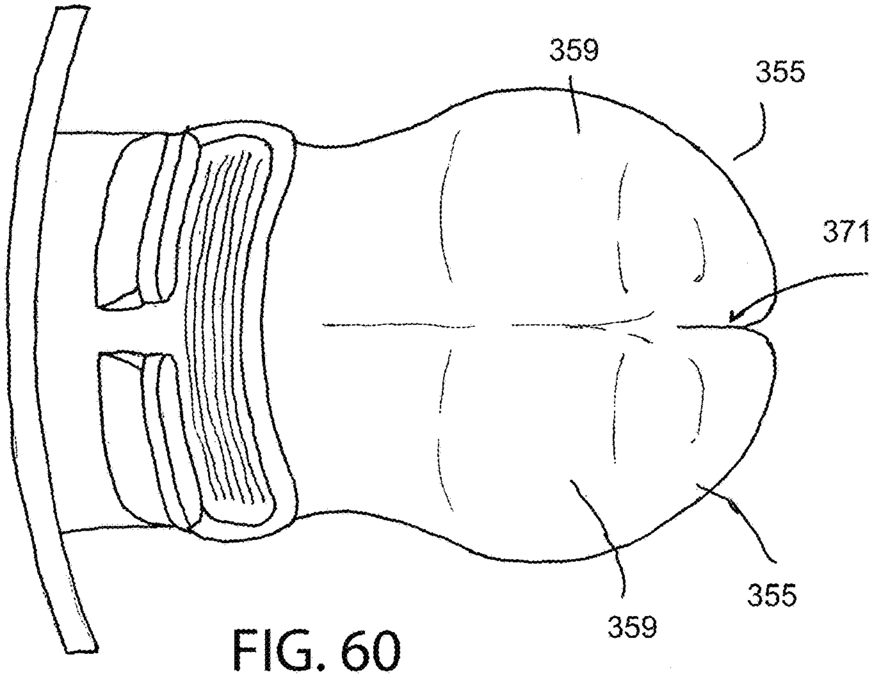
FIG. 60 illustrates a top plan view of the pacifier embodiment of FIG. 54 in resting shape.
Figure 61:
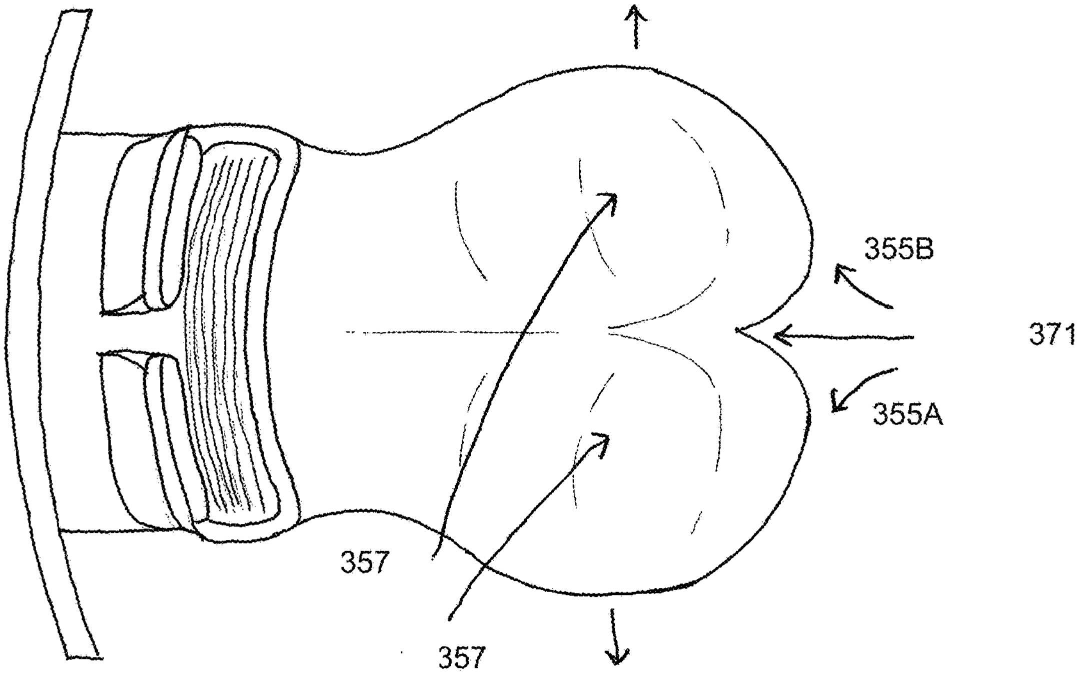
FIG. 61 illustrates a top plan view of the pacifier embodiment of FIG. 54 in extended shape.

As can be seen in FIGS. 51-53, an alternative embodiment of a nipple, or bottle, is shown with articulating extending flanges forming an articulating dual chamber expansion system. In this embodiment, multiple chambers provide for an articulating extension of the flanges to extend both upward and medially/internally towards the vestibule and alveolar ridge to facilitate and encourage contact against the teeth, and/or ridges. The flanges may expand circumferentially, and the articulating movement causes the flange to approximate the mucosa more intimately. As the first, minor, chamber is filed, overflow into the major chamber will have the effect of better approximating the flange to the angle of the alveolar ridge which inclines posteriorly/inwardly. Further, these extended flanges provide a bumper to prevent excessive pronation of the ridges/teeth beyond twenty-degrees. Bite block 40 is set between chambers and extends into nipple 55. Lips provide a push force vector from both upper and lower surfaces. While tongue provides a further push force vector upwards, forcing fluid anteriorly/forwards from cavity within nipple into chambers to extend flanges. As can be seen in FIG. 23, when nipple 55 is compressed, fluid fills into flanges including minor maxillary chamber 72, major maxillary chamber 74, minor mandibular chamber 73, and major mandibular chamber 75. It is contemplated that the minor chambers fill first, extending up and down, while the major chambers fill second, being forced to extend in the distal/internal direction, diagonally both up and down at an angle to cause intimate contact with ridges or ridges/gums (with erupted teeth). Solid portions 71 within flanges are set and do not accept moving fluids but allow for manipulation and change of form, such as balloons.

As can be seen in FIG. 52, sides 76 may provide a location wherein central chamber wall 77 meets superior chamber wall 78 and inferior chamber wall 79. Bite block 40 is shown as two separate bars. Frenum indentation is shown as both maxillary 63 and mandibular 64. As fluid is forced out of nipple and into flanges, fluid first enters minor maxillary and mandibular chambers 72 and 73 via fluid flow arrows shown. As the pressure in the minor chambers rises, fluid is then directed, due to the lower pressure in the major chambers, into the major maxillary and mandibular chambers 74 and 75, causing the flanges to fill the forward buccal vestibules. In this manner, the flanges are articulated in a step-wise fashion so as to force them to extend outward and then distally towards the vaults, or alveolar ridges.

Pacifier embodiments may include buccal flanges, lingual wings to enhance interaction with oral surfaces. Fluid filled chamber(s) cause predictable deformation of bladder and nipple upon suction/use. Articulation of the flanges may be carried out via sectioned bladder portions within the nipple. As bladder is compressed in nipple, flanges expand to intimately fit into the vestibule(s). A bite collar is provided for placement of teeth/alveolar ridges to enhance proper positioning in the mouth at use. OSA pads are used with a high or low durometer, preferably with an internal cleft to allow nipple to deform in a manner to enhance orthotropic treatment against the maxilla or other tissues. Pacifier may include lingual donut, or tongue depression guide to allow proper placement in the mouth, and the frenum reliefs allow for ergonomic it relative tissues in the oral cavity.

As described above relative the pacifier and/or bottle embodiments, pacifier may include offset to encourage proper orthotropic relation of the jaws. Bite collar may be offset to allow a slight overbite, e.g. 1-3 mm. Flanges may also be angled to encourage proper alveolar angle growth, akin to 10-30 degrees, if not twenty degrees from vertical. Movement of fluid in the bladder may cause rhythmic vibrational signaling to induce stem cell growth. OSA features stimulate maxillary guidance and growth.

The present invention is intended to solve the issue of hygienic problems and provide caries management. The present invention may reduce baby bottle caries. As it is known that many newborns have emerged teeth, caries has become a major issue. The benefits of the present invention are both health and hygiene as well as aesthetics of the development of the maxilla and mouth. By using early guidance of maxilla, one may reverse environmental trends to allow for ideal phenotypic expression of the potential genotype so as to create a healthier and more aesthetic environment. The present invention provides potential dual benefit of hygiene and orthotropics to aid/decrease the risks of OSA.

The present invention is also directed to an orthognathically corrected pacifier that serves multiple purposes. The device is orthognathically positioned to help nurture the jaws grow into a better alignment. The device may be made up of two separable, or joined parts: an extra-oral casing preferably of hard plastic, (which may include a bite block, the bite block fitting into) an intra-oral bladder, preferably made of an antibacterial material such as silicone. Preferably, the bladder material has shape-memory to revert to a resting position, and is further free of latex, BPA, and phthalate. The bladder may include a nipple and flange(s). Preferably, the size of the device is scalable to allow a variety of sizes (e.g. small, medium, large or neonatal, infant, toddler). Additionally, the relative size and positions of each feature may be modified to accommodate the changing shape of the human mouth as the child grows.

It is preferred that a single chamber is shared between the flange(s)/wing(s) and the nipple. However, a flexible wall or walls may separate the bladder into two or more chambers. The bladder may be filled with a fluid, such as air, gas, liquid, or a more viscous liquid or gel, so as to allow flanges/wings and nipple to modulate in size and shape based on pressure exerted by the position of various muscle movements of the user's oral cavity. Alternatively, the bladder may be filled with a flowing malleable solid or pressure-dependent solid, or may be a solid feature. It is contemplated that the fluid may be a freezable liquid that can be frozen to make the bladder hard (and cold) to provide a soothing effect, such as the relief of painful teething of erupting teeth. Used in its frozen state, as an appliance to soothe and relieve the very painful eruption of primary teeth, such as a teether, etc. freezing fluid solutions may include water with little to no soluble materials (e.g. salt, etc.).

Under standard operating protocols, the invention provides a method for maintaining oral hygiene. As suckling is conducted, the nipple may be compressed by external forces applied by the patient's oral muscles. The suckling motion causes the nipple to compress, and forces transfer of fluid to engorge the flanges. The flanges are therefore expanded. As the flanges engorge, the textured surface or bristles set on the outer surface of the bladder may contact, and move against (or brush), surfaces of the oral cavity. The textured surface and/or bristles may be of a rigid or softer material such as silicone to provide for the mechanical brushing of the ridges.

Additionally, dentifrices, such as emulsified creams or foams or gels, or tinctures, of oils, minerals, natural cleansers, soothing formulae, analgesics, etc. as may be known in the art to provide for improved oral care, may be provided as a dentifrice in, along, and between bristles or ridges. All age-appropriate manner of dentifrices known in the art for oral care are contemplated for use on the textured exterior surface of the bladder. Essential oils (emulsified, diluted, or pure) are preferred, including peppermint, tea tree, lavender, eucalyptus, oregano, palma rosa, orange, lemongrass, geranium, citronella, etc. Alternatively, toothpastes may be used, preferably without fluoride (so as to be safe for use with babies). Currently, many such products are available and useful, such as glycerin, water, silica, algin, calendula extract, *prunus amygdalus dulcis* oil, clove oil, esculin, limonene, benzocaine, belladonna, xylitol, WINK teething gel, *Olea europaea* oil, *salix alba*, *eugenia caryophyllus* flower oil, rebadiana leaf, *mentha viridis* leaf oil, tocepherol, and many other suitable products as may be known in the art. The dentifrice is applied to the exterior surface of the flanges of the bladder, over and between the textured surface features, such as on and between the bristles. In order to provide proper orthognathic alignment, the maxillary arch is advanced compared to the mandibular arch by approximately one to three millimeters to promote correct orthognathic growth development. This offset is encouraged by the neck, or more preferably an offset as between the trench 108, the superior trench 108A being set 1-3 mm anterior relative inferior trench 108B (as shown in FIG. 36).

As discussed in U.S. Pat. No. 10,555,876, by the inventor of same, herein incorporated by reference, pacifier embodiments may include flanges to clean and stimulate the oral surfaces. A bladder may be compressed to force fluids into flanges as the pacifier bladder is depressed. Flanges expand to fill buccal vestibules, wings may expand to fill lingual vestibules, and flanges serve to engage with surfaces in the oral cavity for cleaning, pressure, and vibrational effects. With or without articulated bladder system and with or without flanges, pacifier 300 may include a bifurcated lobes nipple system 355, as shown in FIGS. 54-61, and otherwise described above. Pacifier 300 includes nipple 55 shaped with bifurcated lobes 355. Bifurcation includes a crevasse 371, or separation of two horizontally arranged lobes 355A and 355B. Crevasse 371 may extend from superior surface 357 to inferior surface 358. Lobe superior surface 357 may include OSA pads 359 either integrally formed, or set within the nipple. Tongue thrust, on inferior side of nipple 355 preferably at tongue guide 21 on inferior surface 358, causes the superior surface 357 to interface with the upper palate (not shown), to compress the nipple thereagainst. As the tongue provides force up against inferior side, and palate forces downward on superior side, nipple is vertically compressed and at least part of the compression causes lateral expansion. Lobes 355A-355B may be easily separated laterally to allow OSA pads to most effectively transfer force vectors to lateral maxillary plates and cause a lateral widening force in both outward directions. Lobes 355A-355B may form one contiguous nipple 355 with the crevasse serving as a midline indentation along the outer surface geometry, and extend or encompass 1/10 to 1/3 of the posterior end of nipple 355 forming a forked tip. Crevasse, or indentation, may extend from superior to inferior sides of nipple shell, and may wrap vertically across (up/down) posterior midline. FIGS. 54, 56, 58 and 60 illustrate the pacifier nipple in resting position, whereas, after forces (from tongue, palate, suction, etc.) are used to compress and pull nipple, FIGS. 55, 57, 59, and 61 demonstrate nipple in compressed form.

Posterior end 360 is bifurcated as lobes 355A and 355B are separated, with interlobe webbing 370 therebetween. Crevasse 371 forms where lobes mate, and crevasse 371 is preferably set posterior of tongue guide 21 and of posterior inferior lingual ridge 22. Lobes 355A and 355B split in center 356. Lobes may be made of a high dummeter material to maintain the shape of the entire lobe, or more preferably the upper surface of lobes retains shape as the nipple 355 is lateral expanded. Lobes maintain shape as pressed up against maxilla to cause outward/lateral and upward forces on maxilla. Tongue guide 21 includes posterior inferior lingual ridge 22 and anterior inferior lingual ridge 23. Tongue guide 21 may form a hemi-torus shape with lateral inferior lingual ridges 320 on either side of tongue guide 21. Tongue guide 21 may include an inverted saddle point 321 as a local high point in guide 21. Thrust by user's tongue may be pressed up into guide 21 and outward to all inferior ridges 22, 23, and 320, further forcing lobes 355 apart. One advantage of this and other embodiments is that as the oral device is compressed, the nipple is extended posteriorly into the oral cavity (towards throat) so that OSA pads can engage deeper (more posterior) against maxillary palate, allowing lateral pressures to press against anterior and posterior maxillary palate.

As shown on FIGS. 54-57 and 60-61. OSA pads 324, including left OSA pad 324A and right OSA pads are shown along superior surface 357 of lobes 355A and 355B respectively. OSA pads 324 are shown in hatching pattern, as preferred embodiments include OSA pads as portions of shell, or extra material within the shell interior set on interior surfaces of shell so as not to impact shell superior surface shape. However, in some embodiments, OSA pads may be set upon outer surface of shell as provide external bumps. As the pacifier 300 is compressed, GSA pads migrate with shell of nipple, as nipple is compressed and flattened, to orient against left and right maxillary plates of the mouth upper palate. While OSA pads 324 are initially set next to, or near one another along superior, as the nipple is compressed, upward forces on bottom of nipple along with other forces, cause the compressed nipple to extend laterally, moving OSA pads laterally apart from one another. In this embodiment, OSA pads may not be bound by central cleft, and instead may be separable features. Gap 325 forms between OSA pads, so OSA pads press against left and right maxillary plates, while not pressing forward on premaxilla. As nipple is flattened, spread laterally, lateral force is exerted on the maxilla with each compression or sucking action.

I claim:

1. An oral pacification device adapted to be at least partially inserted into an oral cavity, the oral pacification device comprising:

an extra-oral base; and an intra-oral nipple extending posteriorly from the extra-oral base, wherein a direction from the extra-oral base to the intra-oral nipple represents a first direction, the intra-oral nipple comprising:

an exterior shell, wherein the exterior shell includes a first side of the intra-oral nipple configured to lay against a tongue and a second side of the intra-oral nipple configured to lay against a roof of a mouth, wherein a direction between the first side and the second side of the intra-oral nipple represents a second direction orthogonal to the first direction;

a chamber within the exterior shell;

a first pad positioned along a third side of the intra-oral nipple, wherein the first pad allows lateral expansion in the second direction of the intra-oral nipple at the first side and the second side;

a second pad positioned along a fourth side of the intra-oral nipple opposite the third side, wherein the second pad allows lateral expansion in the second direction of the intra-oral nipple at the first side and the second side; and a central superior cleft extending on the second side from the extra-oral base to an opposite end of the intra-oral nipple, wherein the central superior cleft is set between the first pad and the second pad.

2. The oral pacification device of claim 1, wherein the first pad extends from the third side to the central superior cleft and the second pad extends from the fourth side to the central superior cleft.

3. The oral pacification device of claim 1, the intra-oral nipple further comprising a tongue guide on the first side of the intra-oral nipple.

4. The oral pacification device of claim 1, wherein the first pad is solid and the second pad is solid.

5. The oral pacification device of claim 1, wherein the first pad and the second pad comprise a self-contained material sac.

6. The oral pacification device of claim 5, wherein the self-contained material sac of the first pad and the self-contained material sac of the second pad each comprise a liquid with non-dissolved particles.

7. The oral pacification device of claim 1, wherein the first pad and the second pad each comprise at least one side having a filleted edge with rounded corners.

8. The oral pacification device of claim 1, the chamber is filled with air, gas, liquid, gel, or malleable solid.

9. The oral pacification device of claim 8, wherein the intra-oral nipple further comprises a flange on the first side or the second side at an extra-oral base end of the intra-oral nipple.

10. The oral pacification device of claim 9, wherein the flange is in fluid communication with the chamber.

11. The oral pacification device of claim 10, wherein the flange is configured to expand to contact a palate upon air, gas, liquid, gel, or malleable solid entering the flange from the chamber.

12. An oral pacification device adapted to be at least partially inserted into an oral cavity, the oral pacification device comprising:

an extra-oral base; and an intra-oral nipple extending posteriorly from the extra-oral base, where a direction from the extra-oral base to the intra-oral nipple represents a first direction, the intra-oral nipple comprising:

an exterior shell, wherein the exteriorshell includes a first side configured to lay against a tongue and a second side configured to lay against a roof of a mouth, wherein a direction between the first side and the second side of the intra-oral nipple represents a second direction orthogonal to the first direction;

a first pad positioned along a third side of the intra-oral nipple, wherein the first pad is a self-contained material sac and allows lateral expansion of the intra-oral nipple at the first side and the second side;

a second pad positioned along a fourth side of the intra-oral nipple opposite the third side, wherein the second pad is a self-contained material sac and allows lateral expansion in the second direction of the intra-oral nipple at the first side and the second side; and a central superior cleft extending on the second side from the extra-oral base to an opposite end of the intra-oral nipple, wherein the central superior cleft is set between the first pad and the second pad, wherein the intra-oral nipple is adapted to form a resting shape and a compressed shape, and wherein the first side and the second side of the intra-oral nipple are expanded outwardly along the central superior cleft in the second direction in the resting shape and collapse inwardly in the second direction in the compressed shape.

13. The oral pacification device of claim 12, wherein the intra-oral nipple further comprises a tongue depression guide on the first side of the intra-oral nipple. and the second pad extends from the fourth side to the central superior cleft.

14. The oral pacification device of claim 12, wherein first pad extends from the third side to the central superior cleft and the second pad extends from the fourth side to the central superior cleft.

15. The oral pacification device of claim 12, wherein the first pad is solid and the second pad is solid.

16. The oral pacification device of claim 12, wherein the self-contained material sac of the first pad and the self-contained material sac of the second pad each contain a liquid with non-dissolved particles.

17. The oral pacification device of claim 12, wherein the first pad and the second pad each comprise at least one side having a filleted edge with rounded corners.

18. The oral pacification device of claim 12, the intra-oral nipple further comprising a chamber within the exterior shell.

19. The oral pacification device of claim 18, the chamber is filled with air, gas, liquid, gel, or malleable solid.

20. The oral pacification device of claim 19, wherein the intra-oral nipple further comprises a flange on the first side or the second side at an extra-oral base end of the intra-oral nipple.

21. The oral pacification device of claim 20, wherein the flange is in fluid communication with the chamber.

22. The oral pacification device of claim 21, wherein the flange is configured to expand to contact a palate upon air, gas, liquid, gel, or malleable solid entering the flange from the chamber.

* * * * *